United States Patent
Wang et al.

(10) Patent No.: US 10,611,252 B2
(45) Date of Patent: Apr. 7, 2020

(54) SYSTEMS AND METHODS FOR UAV BATTERY POWER BACKUP

(71) Applicant: SZ DJI TECHNOLOGY Co., Ltd, Shenzhen (CN)

(72) Inventors: Mingxi Wang, Shenzhen (CN); Hualiang Qiu, Shenzhen (CN); Mingyu Wang, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 204 days.

(21) Appl. No.: 15/230,294

(22) Filed: Aug. 5, 2016

(65) Prior Publication Data

US 2016/0339789 A1 Nov. 24, 2016

Related U.S. Application Data

(63) Continuation of application No. 14/800,487, filed on Jul. 15, 2015, now Pat. No. 9,434,267, which is a
(Continued)

(51) Int. Cl.
*B60L 11/18* (2006.01)
*B60L 53/80* (2019.01)
(Continued)

(52) U.S. Cl.
CPC ............ *B60L 11/1822* (2013.01); *B60L 53/80* (2019.02); *B64C 39/024* (2013.01); *B64D 27/24* (2013.01);
(Continued)

(58) Field of Classification Search
CPC ............ B64C 39/024; B64C 2201/066; B60L 11/1822
(Continued)

(56) References Cited

U.S. PATENT DOCUMENTS 4,700,912 A 10/1987 Corbett
4,795,957 A 1/1989 MacNeal et al.
(Continued)

FOREIGN PATENT DOCUMENTS

CN 101976731 A 2/2011
CN 102044889 A 5/2011
(Continued)

OTHER PUBLICATIONS

Co-pending U.S. Appl. No. 15/376,567, filed Dec. 12, 2016.
(Continued)

*Primary Examiner* — Brian M O'Hara
*Assistant Examiner* — Keith L Dixon
(74) *Attorney, Agent, or Firm* — Anova Law Group, PLLC

(57) ABSTRACT

Systems and methods are provided for swapping the battery on an unmanned aerial vehicle (UAV) while providing continuous power to at least one system on the UAV. The UAV may be able to identify and land on an energy provision station autonomously. The UAV may take off and/or land on the energy provision station. The UAV may communicate with the energy provision station. The energy provision station may store and charge batteries for use on a UAV. The UAV and/or the energy provision station may have a backup energy source to provide continuous power to the UAV.

15 Claims, 20 Drawing Sheets

Related U.S. Application Data continuation of application No. PCT/CN2014/083957, filed on Aug. 8, 2014.

(51) Int. Cl.
  *B64C 39/02* (2006.01)
  *B64D 27/24* (2006.01)
  *B64D 35/02* (2006.01)
  *B64F 1/00* (2006.01)

(52) U.S. Cl.
  CPC .............. *B64D 35/02* (2013.01); *B64F 1/007* (2013.01); *B64C 2201/027* (2013.01); *B64C 2201/042* (2013.01); *B64C 2201/066* (2013.01); *B64C 2201/108* (2013.01); *B64C 2201/182* (2013.01); *Y02T 10/7005* (2013.01); *Y02T 10/7072* (2013.01); *Y02T 90/124* (2013.01); *Y02T 90/14* (2013.01); *Y02T 90/16* (2013.01)

(58) Field of Classification Search
  USPC ...................................................... 244/135 A
  See application file for complete search history.

(56) References Cited

U.S. PATENT DOCUMENTS

| | | | |
|---|---|---|---|
| 5,936,184 A | 8/1999 | Majerus et al. | |
| 6,193,190 B1 | 2/2001 | Nance | |
| 6,604,706 B1 | 8/2003 | Bostan | |
| 6,688,755 B2 | 2/2004 | O'Meara | |
| 6,840,480 B2* | 1/2005 | Carroll | B64C 39/024 |
| | | | 244/117 R |
| 7,398,946 B1 | 7/2008 | Marshall | |
| 7,714,536 B1 | 5/2010 | Silberg et al. | |
| 8,164,300 B2 | 4/2012 | Agassi et al. | |
| 8,511,606 B1* | 8/2013 | Lutke | B64C 39/028 |
| | | | 244/100 R |
| 8,725,330 B2 | 5/2014 | Failing | |
| 8,876,057 B2 | 11/2014 | Alber et al. | |
| 8,880,241 B2 | 11/2014 | Mohamadi | |
| 9,139,310 B1* | 9/2015 | Wang | B64F 1/36 |
| 9,284,062 B2 | 3/2016 | Wang | |
| 9,346,560 B2 | 5/2016 | Wang | |
| 9,434,267 B2 | 9/2016 | Wang | |
| 9,440,545 B2 | 9/2016 | Wang | |
| 9,550,582 B2 | 1/2017 | Wang et al. | |
| 2003/0208302 A1 | 11/2003 | Lemelson et al. | |
| 2004/0211862 A1 | 10/2004 | Elam | |
| 2006/0273749 A1 | 12/2006 | Im | |
| 2009/0140095 A1 | 6/2009 | Sirohi et al. | |
| 2011/0068224 A1 | 3/2011 | Kang et al. | |
| 2011/0071705 A1 | 3/2011 | Matuszeski et al. | |
| 2011/0106294 A1 | 5/2011 | Bebbington | |
| 2012/0126745 A1 | 5/2012 | Partovi et al. | |
| 2013/0081245 A1* | 4/2013 | Vavrina | B60L 11/1822 |
| | | | 29/402.08 |
| 2014/0032034 A1 | 1/2014 | Raptopoulos et al. | |
| 2014/0070052 A1 | 3/2014 | Kang | |
| 2014/0124621 A1 | 5/2014 | Godzdanker et al. | |
| 2014/0129059 A1 | 5/2014 | Scarlatti et al. | |
| 2014/0249741 A1 | 9/2014 | Levien et al. | |
| 2014/0303814 A1 | 10/2014 | Burema et al. | |
| 2014/0319272 A1 | 10/2014 | Casado Magana et al. | |
| 2015/0134274 A1 | 5/2015 | Froom et al. | |
| 2015/0344136 A1 | 12/2015 | Dahlstrom | |
| 2016/0039300 A1 | 2/2016 | Wang | |
| 2016/0039540 A1 | 2/2016 | Wang | |
| 2016/0039541 A1 | 2/2016 | Beardsley et al. | |
| 2016/0039542 A1 | 2/2016 | Wang | |
| 2016/0097851 A1* | 4/2016 | Zhang | B64C 39/024 |
| | | | 342/22 |
| 2016/0144734 A1 | 5/2016 | Wang et al. | |
| 2016/0167807 A1 | 6/2016 | Wang | |
| 2016/0236582 A1 | 8/2016 | Wang | |
| 2016/0318177 A1 | 11/2016 | Bostick et al. | |
| 2016/0375779 A1 | 12/2016 | Wang | |
| 2017/0088288 A1 | 3/2017 | Wang | |
| 2017/0129464 A1 | 5/2017 | Wang et al. | |
| 2017/0129603 A1 | 5/2017 | Raptopoulos et al. | |
| 2017/0190260 A1 | 7/2017 | Wang et al. | |
| 2018/0194466 A1 | 7/2018 | Zhao et al. | |
| 2018/0312069 A1 | 11/2018 | McClymond | |
| 2019/0039752 A1 | 2/2019 | Venturelli et al. | |

FOREIGN PATENT DOCUMENTS

| | | |
|---|---|---|
| CN | 102064578 A | 5/2011 |
| CN | 202089043 U | 12/2011 |
| CN | 202190096 U | 4/2012 |
| CN | 102738890 A | 10/2012 |
| CN | 202642094 U | 1/2013 |
| CN | 202651882 U | 1/2013 |
| CN | 102909540 A | 2/2013 |
| CN | 202922160 U | 5/2013 |
| CN | 202929383 U | 5/2013 |
| CN | 103219763 A | 7/2013 |
| CN | 103359283 A | 10/2013 |
| CN | 103593265 A | 2/2014 |
| CN | 203434741 U | 2/2014 |
| CN | 203491696 U | 3/2014 |
| CN | 103738503 A | 4/2014 |
| CN | 203698671 U | 7/2014 |
| CN | 203845022 U | 9/2014 |
| DE | 102007003458 A1 | 7/2008 |
| EP | 2644438 A2 | 10/2013 |
| EP | 2664539 A1 | 11/2013 |
| EP | 2799336 A1 | 11/2014 |
| JP | H03147116 A | 6/1991 |
| JP | H05189095 A | 7/1993 |
| JP | H105184008 A | 7/1993 |
| JP | H0594236 U | 12/1993 |
| JP | H0627369 U | 4/1994 |
| JP | H10727512 A | 1/1995 |
| JP | H07200108 A | 8/1995 |
| JP | H09315139 A | 12/1997 |
| JP | 3044978 B2 | 5/2000 |
| JP | 3182689 B2 | 7/2001 |
| JP | 2006014524 A | 1/2006 |
| JP | 2006193027 A | 7/2006 |
| JP | 2012056462 A | 3/2012 |
| JP | 2012232654 A | 11/2012 |
| JP | 2013025753 A | 2/2013 |
| JP | 2013203394 A | 10/2013 |
| JP | 2013241177 A | 12/2013 |
| JP | 2014031118 A | 2/2014 |
| JP | 2014104797 A | 6/2014 |
| KR | 20130122715 A | 11/2013 |
| WO | WO 2012/064891 A2 | 5/2012 |
| WO | WO 2013/055265 A1 | 4/2013 |
| WO | 2014020644 A1 | 2/2014 |
| WO | 2014068982 A1 | 5/2014 |
| WO | 2016019564 A1 | 2/2016 |

OTHER PUBLICATIONS

U.S. Appl. No. 15/261,716, filed Sep. 9, 2016, Wang.
International search report and written opinion dated Mar. 12, 2015 for PCT/CN2014/091939.
International search report and written opinion dated Apr. 27, 2015 for PCT/CN2014/083968.
International search report and written opinion dated May 4, 2015 for PCT/CN2014/083957.
International search report and written opinion dated Dec. 31, 2014 for PCT/CN2014/083963.
Notice of allowance dated Apr. 15, 2016 for U.S. Appl. No. 14/832,808.
Notice of allowance dated May 5, 2016 for U.S. Appl. No. 14/800,487.
Notice of allowance dated May 20, 2015 for U.S. Appl. No. 14/495,696.
Notice of allowance dated Jul. 17, 2015 for U.S. Appl. No. 14/495,696.

(56) References Cited

OTHER PUBLICATIONS

Notice of allowance dated Jul. 19, 2016 for U.S. Appl. No. 15/056,957.
Notice of allowance dated Jul. 29, 2015 for U.S. Appl. No. 14/495,696.
Notice of allowance dated Sep. 23, 2016 for U.S. Appl. No. 15/048,948.
Notice of allowance dated Nov. 10, 2015 for U.S. Appl. No. 14/634,489.
Office action dated Feb. 13, 2015 for U.S. Appl. No. 14/495,696.
Office action dated May 20, 2016 for U.S. Appl. No. 15/048,948.
Office action dated Aug. 4, 2015 for U.S. Appl. No. 14/634,489.
Office action dated Dec. 2, 2015 for U.S. Appl. No. 14/832,808.
Office action dated Dec. 31, 2015 for U.S. Appl. No. 14/800,487.
Nigam et al., Control of Multiple UAVs for Persistent Surveillance: Algorithm and Flight Test Results, IEEE Transactions on Control Systems Technology, vol. 20, No. 5, Sep. 1, 2012.

* cited by examiner

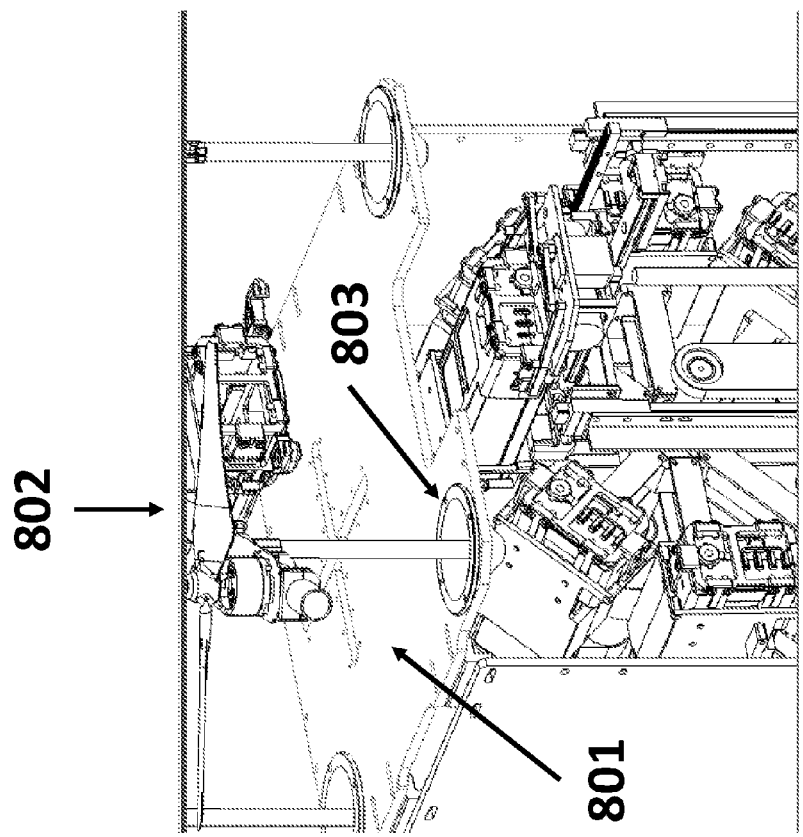
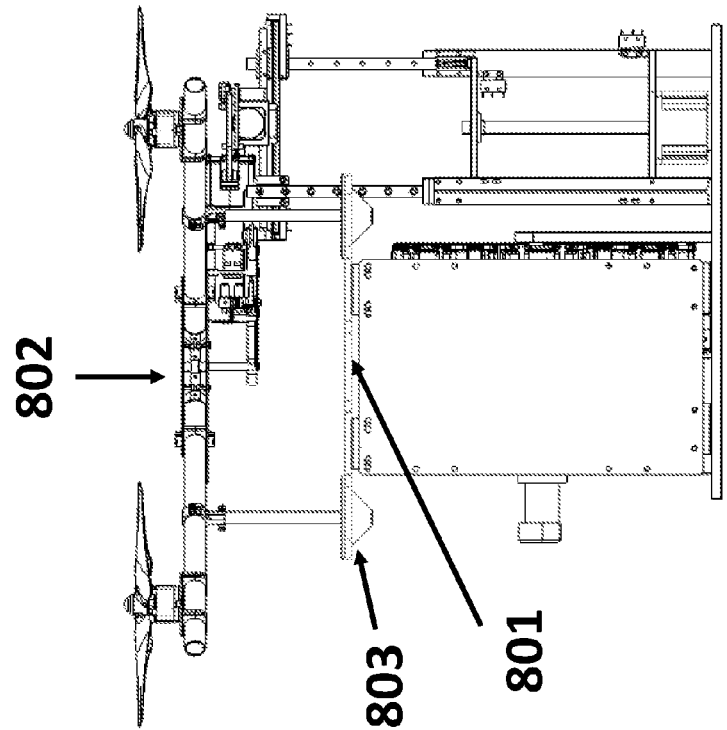
FIG. 8

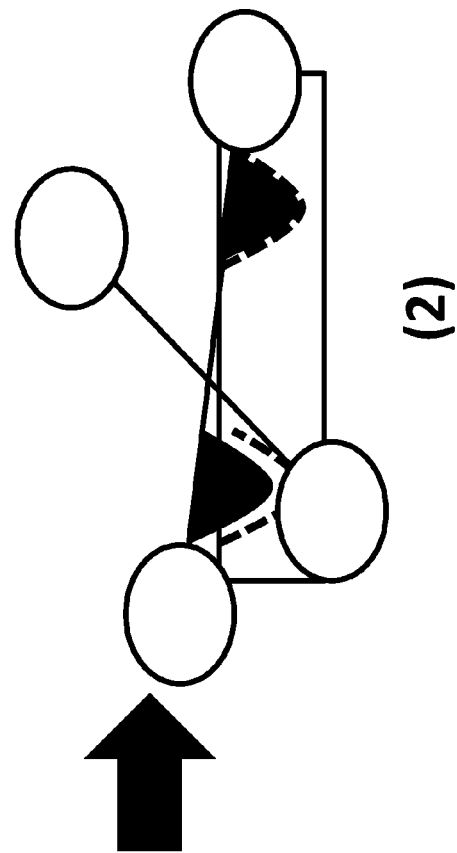
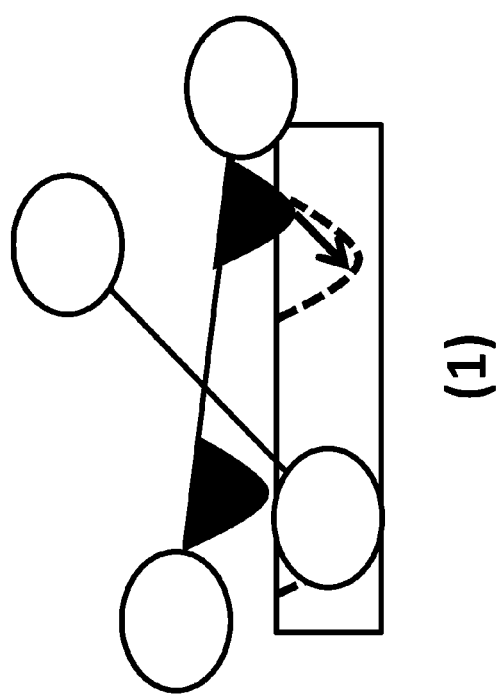
FIG. 9

SYSTEMS AND METHODS FOR UAV BATTERY POWER BACKUP

CROSS REFERENCE

This application is a continuation application of U.S. application Ser. No. 14/800,487, filed on Jul. 15, 2015, which is a continuation application of International Application No. PCT/CN2014/083957, filed on Aug. 8, 2014, the content of which is hereby incorporated by reference in its entirety.

BACKGROUND OF THE INVENTION

Aerial vehicles such as unmanned aerial vehicles (UAVs) can be used for performing surveillance, reconnaissance, and exploration tasks for military and civilian applications. Such aerial vehicles may carry a payload configured to perform a specific function.

Conventional UAV designs may suffer from a number of deficiencies. For instance, certain electrical components of the UAV, such as a controller or inertial measurement unit may lose data if power to the component is lost. A UAV may be powered by an on-board rechargeable battery. In some situations, the battery may be removed from the UAV to be recharged or exchanged for another battery. When the battery is removed, power to the electrical components may be lost, which may cause data in the electrical components to be lost.

SUMMARY OF THE INVENTION

A need exists to continuously provide power to certain electrical components of a UAV to prevent data loss. A further need exists to provide this power while a battery of the UAV is removed for recharging or exchange with another battery. The battery may optionally be removed for reloading energy on the UAV, which may optionally provide an increased range of travel for UAVs. Increased range may be particularly useful when UAVs is used to deliver items, spray an environment, or patrol or scan an area. An automated or semi-automated battery charging station may advantageously permit battery life on a UAV to be reloaded. Battery life may be reloaded on a UAV by recharging the on board battery of the UAV or exchanging the onboard battery for another battery. During recharging of the battery on board the UAV the system may be without power. Loss of power may result in loss of data collected by sensors on board the UAV. This may include data stored on a controller or inertial measurement unit of the UAV, which may be useful for navigation or other functions of the UAV. A system capable of providing consistent power to a UAV during battery recharging may be advantageous.

An aspect of the invention may include a UAV comprising: a propulsion unit configured to effect movement of the UAV and a power unit comprising: a first battery configured to power (1) the propulsion unit and (2) a power consuming unit of the UAV, wherein the power unit is configured to switch between (a) a first mode wherein the first battery is providing power to (1) the propulsion unit and (2) the power consuming unit and (b) a second mode wherein the second battery is providing power to the power consuming unit, and not providing power to the propulsion unit.

In some embodiments the UAV may have a propulsion unit that includes one or more rotors configured to generate lift for the UAV. The UAV may have a power consuming unit wherein the power consuming unit is one or more of the following a global positioning system (GPS) sensor, motion sensor, inertial measurement unit sensor, proximity sensor, and/or image sensor. The power unit may be switched to the second mode when the UAV is resting on a surface. The power unit may be configured to be switched from the first mode to the second mode prior to or as the first battery is removed from the UAV, and while continuous power is provided to the power consuming unit. The power unit may be configured to be switched from the second mode to the first mode when the first battery is coupled to the UAV and prepared to provide power. The power unit may be switched to the second mode when the UAV is not using the propulsion unit. The power unit may be configured to switch between the first and second mode when the voltage of the first battery falls beneath the voltage of the second battery. The power unit may include a unidirectional diode that prevents current from flowing from the second battery to the power consuming unit. The unidirectional diode may have a positive end facing the second battery and a negative end facing the power consuming The power unit may include and electrical switch that is in a closed position during the first and second mode and an open position when the UAV is to be powered off.

In some cases the UAV may have a charging control unit between the first battery and the second battery, wherein the charging control unit is configured to control charging of the second battery by the first battery.

In some instances the first battery may not provide power during the second mode. The first battery may be decoupled from the UAV during the second mode. The first battery may be electrically connected to the second battery during the first mode. The first battery may be configured to provide lower voltage power than the first battery Aspects of the invention may further include a method of providing energy to a UAV, said method comprising: powering (1) a propulsion unit, and (2) a power consuming unit of the UAV with a first battery powering the power consuming unit of the UAV with a second battery without powering the propulsion unit with the second battery no longer powering (1) the propulsion unit, and (2) the power consuming unit of the UAV with the first battery.

In some cases the propulsion unit includes one or more rotors configured to generate lift for the UAV. The UAV may be resting on a surface when no longer powering (1) the propulsion unit, and (2) the power consuming unit of the UAV with the first battery. The UAV may be in flight when powering (1) the propulsion unit, and (2) the power consuming unit of the UAV with the first battery.

The energy provision station may include a battery replacement member configured to decouple the first battery from the UAV.

In some instances the method may further include charging the second battery while powering (1) the propulsion unit, and (2) the power consuming unit of the UAV with the first battery. The method may further include charging the second battery with the first battery while the UAV is in flight. The power unit may comprise a unidirectional diode that prevents current from flowing from the second battery to the power consuming unit. The unidirectional diode may have a positive end facing the second battery and a negative end facing the power consuming The second battery may be configured to provide lower voltage than the first battery.

A method of providing energy to a UAV may be provided in accordance with another aspect of the invention. The method may comprise: powering (1) a propulsion unit, and (2) a power consuming unit of the UAV with a first battery; charging a second battery with the first battery; powering the power consuming unit of the UAV with the second battery; no longer powering (1) the propulsion unit, and (2) the power consuming unit of the UAV with the first battery. The second battery may provide charge to a first battery while the UAV is in flight.

The propulsion unit may include one or more rotors configured to generate lift for the UAV.

The UAV may be resting on a surface when no longer powering (1) the propulsion unit, and (2) the power consuming unit of the UAV with the first battery. The surface may be a landing area of an energy provision station configured to recharge the first battery and/or exchange the first battery for another battery.

In some cases the energy provision station may comprise a battery replacement member configured to decouple the first battery from the UAV.

The method may further include charging the second battery while powering (1) the propulsion unit, and (2) the controller and/or the inertial measurement unit of the UAV with the first battery The power unit may comprise a unidirectional diode that prevents current from flowing from the second battery to the power consuming unit. The unidirectional diode may have a positive end facing the second battery and a negative end facing the power consuming In another embodiment the invention may include a method of providing continuous power supply to a UAV. The method may comprise providing a UAV coupled to a battery that provides power to the UAV; decoupling the battery from the UAV, such that the battery no longer provides power to said UAV; prior to or concurrent with said decoupling of set (b), providing power to the UAV using a power unit, thereby causing the UAV to remain powered before, during, and after the battery is decoupled from the UAV.

The method may further comprise supporting the UAV on the UAV landing area of an energy provision station. The method may further comprise decoupling the battery from the UAV using a battery replacement member. The method may further comprise coupling another battery to the UAV, wherein the other battery is configured to provide power to the UAV upon being coupled to the UAV. The other battery may be coupled to the UAV using a battery replacement member that decouples the battery from the UAV. The method may further comprise coupling, using the battery replacement member, the battery to the UAV, after charging the battery while the battery is decoupled from the UAV. The other battery may have a higher level of charge when coupled to the UAV than the battery when the battery is decoupled from the UAV.

The battery replacement member may be part of the energy provision station. In some cases the battery replacement member may be a robotic arm.

The UAV may be a rotorcraft capable of taking off from a station vertically. The UAV may be a rotorcraft capable of landing on the station vertically.

The UAV landing area may include visible markers configured to aid the UAV in landing. The visible markers may be LED lights or images.

In some cases the energy provision station may be portable.

The method may further comprise removing the other battery from a movable battery storage unit comprising a plurality of holding stations configured to collectively store a plurality of batteries capable of powering the UAV upon being coupled to the UAV, wherein the movable battery storage section is configured to permit simultaneous movement of the plurality of holding stations relative to the UAV landing area. The method may further include providing power to the UAV, using the power unit during an entire time that no battery is coupled to the UAV. The method may also include coupling the power unit to the UAV before decoupling the battery from the UAV.

The power unit may be an electrical line from an electrical energy source. The electrical energy source may be a renewable energy generation power source. The electrical energy source may be a power grid. The power unit may be another battery. The other battery may be on board an energy provision station supporting a UAV. The other battery may be onboard the UAV.

In some embodiments the UAV may have a maximum dimension of no more than 100 cm. The UAV may include a recessed region into which the battery is removed to decouple from the UAV. The UAV may include a recessed region into which the battery is inserted to couple to the UAV and provide power to the UAV. The battery or another battery may be configured to be inserted into the recessed region to couple to the UAV and provide power to the UAV after the battery is decoupled from the UAV.

The battery may be stored in a movable storage unit comprising a plurality of holding stations configured to collectively store a plurality of batteries capable of powering the UAV upon being coupled to the UAV, wherein the movable battery storage section is configured to permit simultaneous movement of the plurality of holding stations relative to the UAV landing area.

In another embodiment the invention may include a UAV energy provision station, the energy provision station may comprise: a UAV landing area configured to support a UAV when the UAV is resting on the station, said UAV being coupled to a battery that provides power to the UAV; a battery replacement member configured to decouple the battery from the UAV, such that the battery no longer provides power to said UAV; a power unit configured to provide power to the UAV prior to or concurrent with said decoupling, and thereby cause the UAV to remain powered, before, during, and after the battery is decoupled from the UAV.

The UAV energy provision station may further include a support for the UAV on the UAV landing area of an energy provision station. The energy provision station may further comprise a battery replacement member. The battery replacement member may be part of the energy provision station. The battery replacement member may be a robotic arm.

The UAV may be a rotorcraft capable of taking off from a station vertically. The UAV may be a rotorcraft capable of landing on the station vertically.

The UAV landing area may include visible markers configured to aid the UAV in landing. The visible markers may be LED lights or images.

In some cases the energy provision station may be portable.

The UAV energy provision station may further comprise another battery coupled to the UAV, wherein the other battery is configured to provide power to the UAV upon being coupled to the UAV. The other battery may be coupled to the UAV using a battery replacement member that decouples the battery from the UAV. The other battery may have a higher level of charge when coupled to the UAV than the battery when the battery is decoupled from the UAV. The UAV energy provision station may further include a movable battery storage unit comprising a plurality of holding stations configured to collectively store a plurality of batteries capable of powering the UAV upon being coupled to the UAV, wherein the movable battery storage section if configured to permit simultaneous movement of the plurality of holding stations relative to the UAV landing area.

In some instances the energy provision station may further comprise a power unit configured to provide power to the UAV for an entire time that no battery is coupled to the UAV. The power unit may be an electrical line from an electrical energy source. The electrical energy source may be a renewable energy generation power source. The electrical energy source may be a power grid. The power unit may be another battery. The other battery may be on board the energy provision station supporting the UAV. The other battery may be on board the UAV.

In some cases the UAV may have a maximum dimension of no more than 100 cm. The UAV may include a recessed region into which the battery is removed to decouple from the UAV. The UAV may include a recessed region into which the battery is inserted to couple to the UAV and provide power to the UAV. The battery or another battery may be configured to be inserted into the recessed region to couple to the UAV and provide power to the UAV after the battery is decoupled from the UAV.

The battery may be in a moveable battery storage unit comprising a plurality of holding station configured to collectively store a plurality of batteries capable of powering the UAV upon being coupled to the UAV, wherein the movable battery storage section is configured to permit simultaneous movement of the plurality of holding stations relative to the UAV landing area.

In another embodiment the invention may include a UAV energy provision station, the station may comprise a UAV landing area configure to support a UAV when the UAV is resting on the station, said UAV being coupled to (1) a battery that provides power to the UAV and (2) a backup power source that provides power to the UAV when the battery is not coupled to the UAV; and a battery replacement member configured to decouple the battery from the UAV, such that the battery no longer provides power to said UAV, and the backup power source being configured to provide power to the UAV prior to or concurrent with said decoupling, and thereby cause the UAV to remain powered before, during, and after the battery is decoupled from the UAV.

The backup power source may be another battery on board the UAV. The backup power source may be a renewable energy generation power source on board the UAV.

The UAV energy provision station may further comprise a support for the UAV on the UAV landing area of the energy provision station. The energy provision station may include a battery replacement member. The battery replacement member may be part of the energy provision station. The battery replacement member may be a robotic arm.

The UAV may be a rotorcraft capable of taking off from a station vertically. The UAV may be a rotorcraft capable of landing on the station vertically.

The UAV landing area may include visible markers configured to aid the UAV in landing. The visible markers may be LED lights or images.

In some cases the energy provision station may be portable.

The UAV energy provision station may further comprise another battery coupled to the UAV, wherein the other battery is configured to provide power to the UAV upon being coupled to the UAV. The other battery may be coupled to the UAV using a battery replacement member that decouples the battery from the UAV. The other battery may have a higher level of charge when coupled to the UAV than the battery when the battery is decoupled from the UAV. The UAV energy provision station may further include a movable battery storage unit comprising a plurality of holding stations configured to collectively store a plurality of batteries capable of powering the UAV upon being coupled to the UAV, wherein the movable battery storage section if configured to permit simultaneous movement of the plurality of holding stations relative to the UAV landing area.

In some instances the energy provision station may further comprise a power unit configured to provide power to the UAV for an entire time that no battery is coupled to the UAV. The power unit may be an electrical line from an electrical energy source. The electrical energy source may be a renewable energy generation power source. The electrical energy source may be a power grid. The power unit may be another battery. The other battery may be on board the energy provision station supporting the UAV. The other battery may be on board the UAV.

In some cases the UAV may have a maximum dimension of no more than 100 cm. The UAV may include a recessed region into which the battery is removed to decouple from the UAV. The UAV may include a recessed region into which the battery is inserted to couple to the UAV and provide power to the UAV. The battery or another battery may be configured to be inserted into the recessed region to couple to the UAV and provide power to the UAV after the battery is decoupled from the UAV.

The battery may be in a movable battery storage unit comprising a plurality of holding stations configured to collectively store a plurality of batteries capable of powering the UAV upon being coupled to the UAV, wherein the movable battery storage section is configured to permit simultaneous movement of the plurality of holding stations relative to the UAV landing area.

In another case the invention may include a method of providing energy to a UAV, the method may comprise: providing a UAV coupled to a battery configured to power the UAV; assessing, with the aid of a processor, a reliability of (1) a first backup energy source for the UAV configured to power the UAV when the battery is decoupled from the UAV, and (2) a second backup energy source for the UAV when battery is decoupled from the UAV; selecting with the aid of a processor, the first backup energy source or the second backup energy source based on the assessed reliability.

The method may further comprise supporting the UAV on the UAV landing area of an energy provision station. The method may also include decoupling the battery from the UAV using a battery replacement member of the energy provision station. The first backup energy source may be another battery on board the UAV. A lower state of charge may correspond to a lower assessed reliability for the first backup energy source. The second backup energy source may be a power unit on board an energy provision station that supports the UAV while the UAV is not in flight. The reliability may be assessed based on the consistency of power over time provided by the power unit. A greater inconsistency may correspond to a lower assessed reliability for the second backup energy source. The first backup energy source may be selected when the first backup energy source has a higher assessed reliability than the second backup energy source, and wherein the second backup energy source is selected when the second backup energy source has a higher assessed reliability than the first backup energy source. The first backup energy source is selected when the first backup energy source is a default source, when the first backup energy source's assessed reliability does not fall beneath a predetermined threshold, and wherein the second backup energy source is selected when the second backup energy source is a default source, when the second backup energy source's assessed reliability does not fall beneath a predetermined threshold.

The method may further comprise decoupling the second battery from the UAV using a battery replacement member, the battery being configured to not power the UAV when decoupled from the UAV; providing power to the UAV using the selected first backup energy source or second backup energy source while no battery is coupled to the UAV.

Other objects and features of the present invention will become apparent by a review of the specification, claims, and appended figures.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

FIG. 8 shows a detailed view of a UAV mating with a landing guide.

FIG. 9 shows self-correction of a UAV landing on a landing guide.

DETAILED DESCRIPTION OF THE INVENTION

In one embodiment, the present invention provides systems, devices, and/or methods involving a mechanism of providing continuous power to an unmanned aerial vehicle (UAV). Description of the UAV may be applied to any other type of unmanned vehicle, or any other type of movable object. Description of the vehicle may apply to land-bound, underground, underwater, water surface, aerial, or space-based vehicles. Providing continuous power to the UAV may include an interaction with an energy provision station. The interaction may include docking between the energy provision station and the UAV. Communications may occur between the UAV and the energy provision station while the UAV is separated from the energy provision station and/or while the UAV is connected to the energy provision station. The UAV may be powered by a first rechargeable battery which may be recharged while onboard the UAV or removed from the UAV prior to recharging. The UAV may also have a second battery or secondary power source in addition to the first rechargeable battery. The energy provision station may exchange the first or second battery onboard the UAV for another battery. The energy provision station may store batteries. The energy provision station may be movable relative to a UAV. The energy provision station may provide power to the UAV while it is removing a first or second battery from the UAV such that the UAV is continually connected to a power supply. The energy provision station may provide power to the UAV using a battery on board the energy provision station or a renewable energy source.

Figure 1:
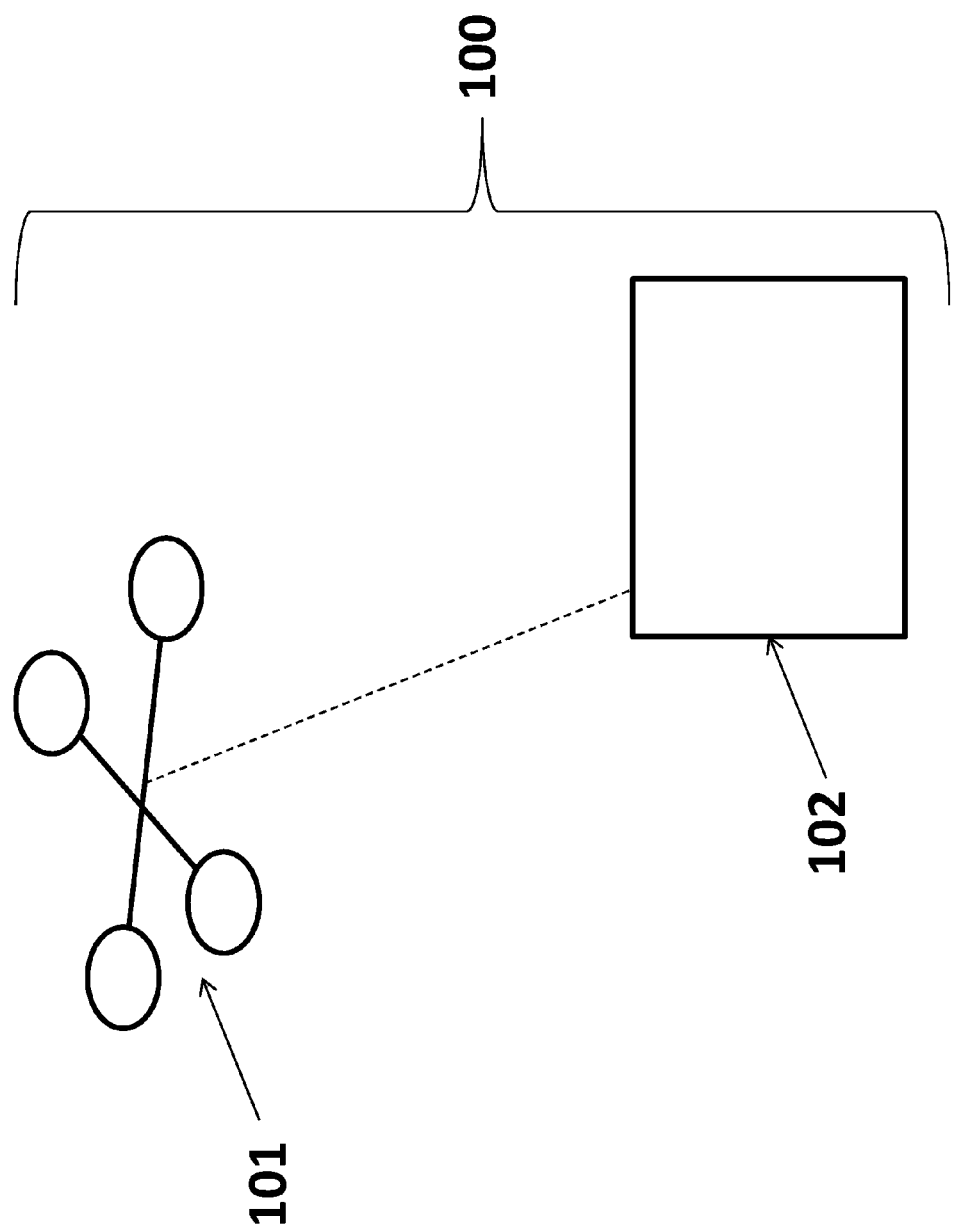
FIG. 1 shows a battery charging system including a UAV for use in the system and a energy provision station.

FIG. 1 shows an example of an unmanned aerial vehicle (UAV) that may be associated with an energy provision station. The UAV may land on or take off from the energy provision station. An energy provision system 100 may be provided in accordance with an embodiment of the invention. The energy provision system may comprise a UAV 101 and an energy provision station 102. The UAV may be adapted to identify and communicate with the energy provision station.

Any description herein of a UAV 101 may apply to any type of movable object. The description of a UAV may apply to any type of unmanned movable object (e.g., which may traverse the air, land, water, or space). The UAV may be capable of responding to commands from a remote controller. The remote controller may be not connected to the UAV, the remote controller may communicate with the UAV wirelessly from a distance. In some instances, the UAV may be capable of operating autonomously or semi-autonomously. The UAV may be capable of following a set of pre-programmed instructions. In some instances, the UAV may operate semi-autonomously by responding to one or more commands from a remote controller while otherwise operating autonomously. For instance, one or more commands from a remote controller may initiate a sequence of autonomous or semi-autonomous actions by the UAV in accordance with one or more parameters.

The UAV 101 may be an aerial vehicle. The UAV may have one or more propulsion units that may permit the UAV to move about in the air. The one or more propulsion units may enable the UAV to move about one or more, two or more, three or more, four or more, five or more, six or more degrees of freedom. In some instances, the UAV may be able to rotate about one, two, three or more axes of rotation. The axes of rotation may be orthogonal to one another. The axes of rotation may remain orthogonal to one another throughout the course of the UAV's flight. The axes of rotation may include a pitch axis, roll axis, and/or yaw axis. The UAV may be able to move along one or more dimensions. For example, the UAV may be able to move upwards due to the lift generated by one or more rotors. In some instances, the UAV may be capable of moving along a Z axis (which may be up relative to the UAV orientation), an X axis, and/or a Y axis (which may be lateral). The UAV may be capable of moving along one, two, or three axes that may be orthogonal to one another.

The UAV 101 may be a rotorcraft. In some instances, the UAV may be a multi-rotor craft that may include a plurality of rotors. The plurality of rotors may be capable of rotating to generate lift for the UAV. The rotors may be propulsion units that may enable the UAV to move about freely through the air. The rotors may rotate at the same rate and/or may generate the same amount of lift or thrust. The rotors may optionally rotate at varying rates, which may generate different amounts of lift or thrust and/or permit the UAV to rotate. In some instances, one, two, three, four, five, six, seven, eight, nine, ten, or more rotors may be provided on a UAV. The rotors may be arranged so that their axes of rotation are parallel to one another. In some instances, the rotors may have axes of rotation that are at any angle relative to one another, which may affect the motion of the UAV.

Figure 2:
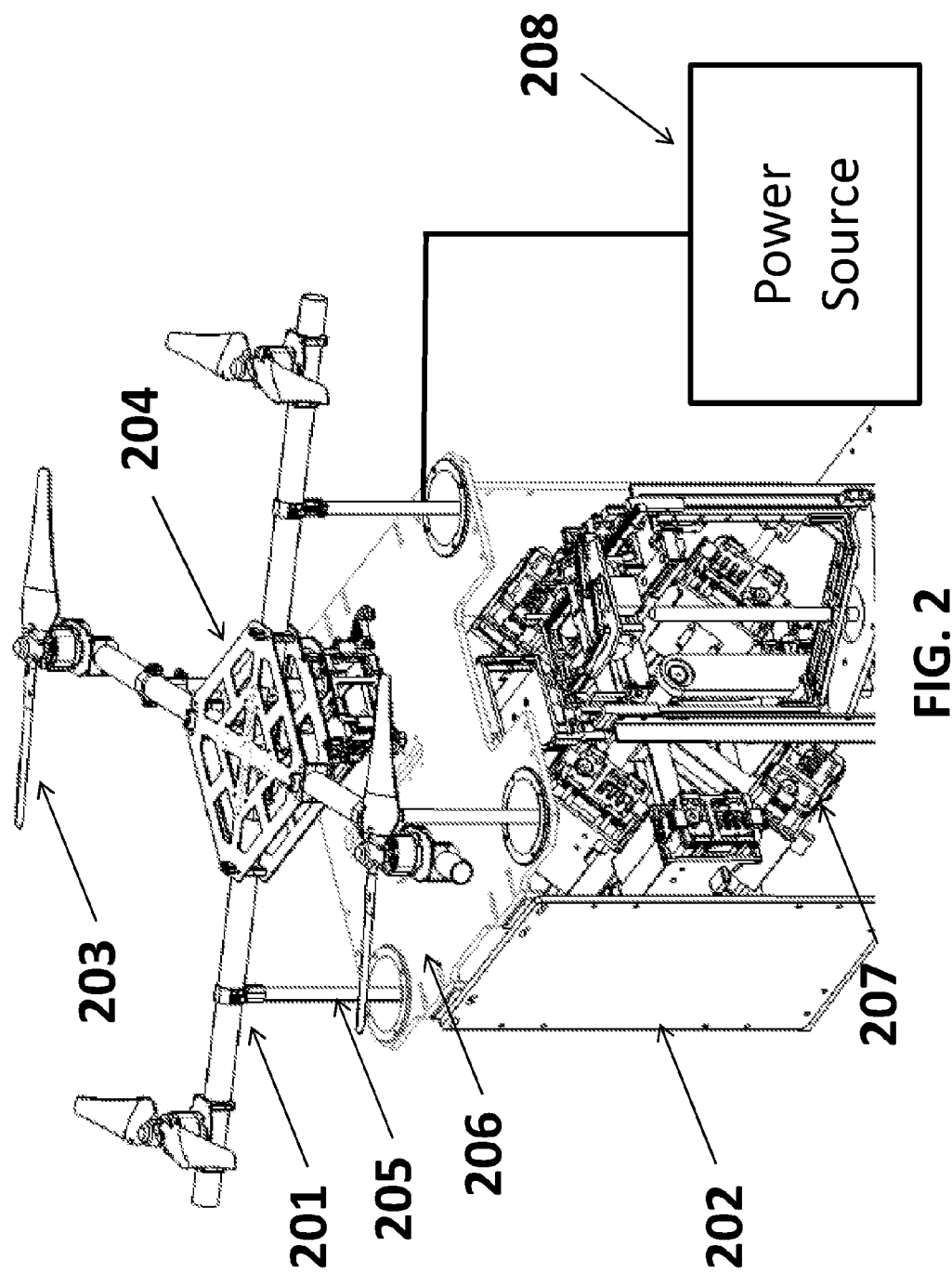
FIG. 2 shows a detailed example of a energy provision station.

FIG. 2 shows a detailed view of a possible embodiment of an energy provision system comprising the UAV 201 and the energy provision station 202. The UAV 201 shown in FIG. 2 is an example of a UAV that can be part of the energy provision system. The UAV shown may have a plurality of rotors 203. The rotors 203 may connect to the body of the UAV 204 which may comprise a control unit, inertial measuring unit (IMU), processor, battery, power source, and/or other sensors. The rotors may be connected to the body via one or more arms or extensions that may branch from a central portion of the body. For example, one or more arms may extend radially from a central body of the UAV, and may have rotors at or near the ends of the arms.

The UAV may be situated on a surface of the energy provision station by a landing stand 205. The landing stand may be configured to support the weight of the UAV when the UAV is not airborne. The landing stand may include one or more extension members that may extend from the UAV. The extension members of the landing stand may extend from one or more arms of the UAV, or from a central body of the UAV. The extension members of the landing stand may extend from beneath one or more rotors, or near one or more rotors. The extension members may extend substantially vertically.

The energy provision station 202 may be a battery station. The energy provision station may be a ground station. The energy provision station may be a battery changing station or battery exchange station. The energy provision station may be a battery recharging station. The energy provision station may be portable. The energy provision station may be capable of being carried by a human. The energy provision station may be capable of being lifted by a human in one or two hands. The energy provision station may be reconfigurable or folded in on itself to become more portable.

The energy provision station 202 may have a landing area for a UAV 206. Any surface of the energy provision station may be adapted to comprise the landing area. For example, a top surface of the energy provision station may form a landing area. Optionally, one or more platforms may be provided as a landing area for the UAV. The platforms may or may not include any sides, ceilings, or covers.

The energy provision station 202 may further comprise a battery storage system. The battery storage system may be configured to store one or more batteries. The battery storage system may charge the one or more stored batteries. In the example shown in FIG. 2 the battery storage system 207 is shown below the landing area 206. Another component of an energy provision station may be a mechanism configured to remove a battery from a UAV and to replace the removed battery with a fully or partially charged battery from the battery storage system.

The energy provision station 202 may have an on board power source 208. The on board power source may be a battery, capacitor, electric generator, wind turbine, hydro turbine, or solar power generator. The on board power source may be used to provide power to the UAV while a battery is removed from the UAV such that continuous power is provided to the UAV while the battery is exchanged for a fully or partially charged battery from the battery storage unit. Optionally, an off board power source may be used to provide power to an on board power source or to provide power directly to a UAV. Examples of off board power sources may include a utility grid, off-site renewable power generation source, or an offsite energy storage facility.

A vertical position and/or velocity of the UAV may be controlled by maintaining and/or adjusting output to one or more propulsion units of the UAV. For example, increasing the speed of rotation of one or more rotors of the UAV may aid in causing the UAV to increase in altitude or increase in altitude at a faster rate. Increasing the speed of rotation of the one or more rotors may increase the thrust of the rotors. Decreasing the speed of rotation of one or more rotors of the UAV may aid in causing the UAV to decrease in altitude or decrease in altitude at a faster rate. Decreasing the speed of rotation of the one or more rotors may decrease the thrust of the one or more rotors. When a UAV is taking off, such as from an energy provision station, the output may be provided to the propulsion units may be increased from its previous landed state. When the UAV is landing, such as on an energy provision station, the output provided to the propulsion units may be decreased from its previous flight state. The UAV may be configured to take off and/or land on an energy provision station in a substantially vertical manner.

A lateral position and/or velocity of the UAV may be controlled by maintaining and/or adjusting output to one or more propulsion units of the UAV. The altitude of the UAV and the speed of rotation of one or more rotors of the UAV may affect the lateral movement of the UAV. For example, the UAV may be tilted in a particular direction to move in that direction, and the speed of the rotors of the UAV may affect the speed of the lateral movement and/or trajectory of movement. Lateral position and/or velocity of the UAV may be controlled by varying or maintaining the speed of rotation of one or more rotors of the UAV.

The UAV 101 may be of small dimensions. The UAV may be capable of being lifted and/or carried by a human. The UAV may be capable of being carried by a human in one hand. The energy provision station may have a landing area configured to provide a space for the UAV to land. The UAV dimensions may optionally not exceed the width of the energy provision station landing area. The UAV dimensions may optionally not exceed the length of the energy provision station landing area.

The UAV 101 may have a greatest dimension (e.g., length, width, height, diagonal, diameter) of no more than 100 cm. In some instances, the greatest dimension may be less than or equal to 1 mm, 5 mm, 1 cm, 3 cm, 5 cm, 10 cm, 12 cm, 15 cm, 20 cm, 25 cm, 30 cm, 35 cm, 40 cm, 45 cm, 50 cm, 55 cm, 60 cm, 65 cm, 70 cm, 75 cm, 80 cm, 85 cm, 90 cm, 95 cm, 100 cm, 110 cm, 120 cm, 130 cm, 140 cm, 150 cm, 160 cm, 170 cm, 180 cm, 190 cm, 200 cm, 220 cm, 250 cm, or 300 cm. Optionally, the greatest dimension of the UAV may be greater than or equal to any of the values described herein. The UAV may have a greatest dimension falling within a range between any two of the values described herein.

The UAV 101 may be lightweight. For example, the UAV may weigh less than or equal to 1 mg, 5 mg, 10 mg, 50 mg, 100 mg, 500 mg, 1 g, 2 g, 3 g, 5 g, 7 g, 10 g, 12 g, 15 g, 20 g, 25 g, 30 g, 35 g, 40 g, 45 g, 50 g, 60 g, 70 g, 80 g, 90 g, 100 g, 120 g, 150 g, 200 g, 250 g, 300 g, 350 g, 400 g, 450 g, 500 g, 600 g, 700 g, 800 g, 900 g, 1 kg, 1.1 kg, 1.2 kg, 1.3 kg, 1.4 kg, 1.5 kg, 1.7 kg, 2 kg, 2.2 kg, 2.5 kg, 3 kg, 3.5 kg, 4 kg, 4.5 kg, 5 kg, 5.5 kg, 6 kg, 6.5 kg, 7 kg, 7.5 kg, 8 kg, 8.5 kg, 9 kg, 9.5 kg, 10 kg, 11 kg, 12 kg, 13 kg, 14 kg, 15 kg, 17 kg, or 20 kg. The UAV may have a weight greater than or equal to any of the values described herein. The UAV may have a weight falling within a range between any two of the values described herein.

One or more components of the UAV may be powered by a battery. For example the entire UAV may be powered by a battery or only a propulsion unit, controller, communication unit, Inertial Measure Unit (IMU), and/or other sensors may be powered by a battery. Battery can refer to a single battery or a pack of two or more batteries. An example of a battery may include a lithium ion battery, alkaline battery, nickel cadmium battery, lead acid battery, or nickel metal hydride battery. The battery may be a disposable or a rechargeable battery. The life time of the battery (i.e. amount of time it will provide power to the UAV before needing a recharge) may vary; the life time may be at least 1 min, 5 min, 10 min, 15 min, 30 min, 45 min, 1 hr, 2 hrs, 3 hrs, 4 hrs, 5 hrs, or 10 hrs. The battery life may have a duration greater than or equal to any of the values described herein. The battery life may have a duration falling within a range between any two of the values described herein.

A UAV may have a first and second battery. The first battery may provide power to the propulsion unit and to a power consuming unit. The power consuming unit may be a non-propulsion unit. The power consuming unit may be one or more components able to collect and/or store information. It may be desirable to provide continuous power to the power consuming unit for constant information processing, retrieval, or storage. The power consuming unit may be one or more of the following controllers (i.e. control units) communication unite, navigation unit, emitter (e.g. light or audio emitter), and/or sensors. Example of sensors may include but are not limited to location sensors (e.g., global positioning system (GPS) sensors, mobile device transmitters enabling location triangulation), vision sensors (e.g., imaging devices capable of detecting visible, infrared, or ultraviolet light, such as cameras), proximity sensors (e.g., ultrasonic sensors, lidar, time-of-flight cameras), inertial sensors (e.g., accelerometers, gyroscopes, inertial measurement units (IMUs)), altitude sensors, pressure sensors (e.g., barometers), audio sensors (e.g., microphones) or field sensors (e.g., magnetometers, electromagnetic sensors). Any suitable number and combination of sensors can be used, such as one, two, three, four, five, or more sensors. Optionally, the data can be received from sensors of different types (e.g., two, three, four, five, or more types). Sensors of different types may measure different types of signals or information (e.g., position, orientation, velocity, acceleration, proximity, pressure, etc.) and/or utilize different types of measurement techniques to obtain data. For instance, the sensors may include any suitable combination of active sensors (e.g., sensors that generate and measure energy from their own source) and passive sensors (e.g., sensors that detect available energy).

The second battery may be configured only to provide power to the power consuming unit. Any description herein of a controller or IMU may apply to any type of power consuming unit and vice versa. Any description here of controller and/or IMU or battery not powering or providing power to a controller and/or IMU may apply to power consuming units in general or any specific type. The UAV may operate in two modes such that in the first mode the first battery provides power to the propulsion unit and the energy consuming unit. In a second mode the first battery may not provide power to the propulsion unit and only the second battery may provide power to the energy consuming unit. The second mode may require that the UAV is landed. The second mode may be implemented when the propulsion unit is not in use. The first mode may be implemented when a first battery has a sufficient charge to power the propulsion unit and while a first battery is coupled to the UAV.

Figure 3:
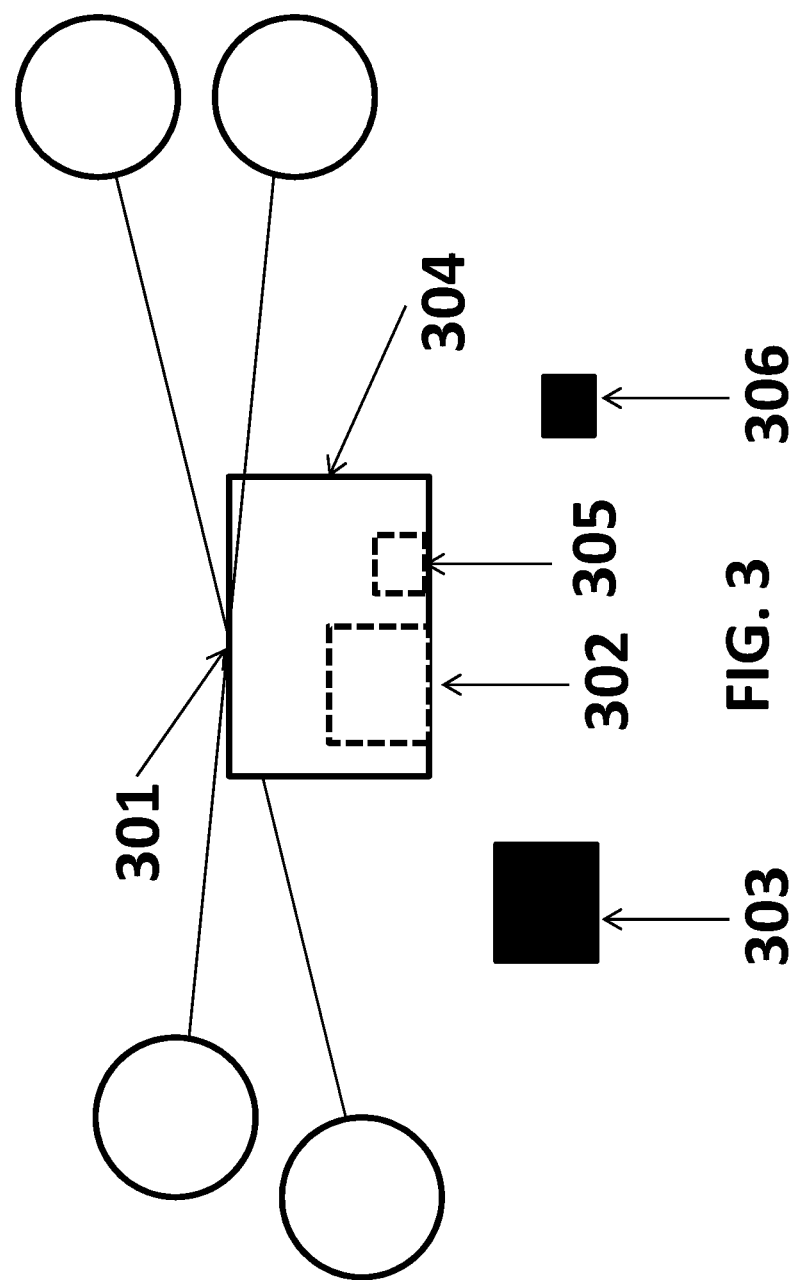
FIG. 3 shows a UAV with a recessed region for housing of at least one battery.

A battery may be coupled to the UAV to provide power to the UAV by an electrical connection. Any description herein of a battery may apply to one or more batteries. Any description of a battery may apply to a battery pack, and vice versa, where a battery pack may include one or more batteries. Batteries may be connected in series, in parallel, or any combination thereof. An electrical connection between a UAV and a battery or a component of a UAV and a battery may be provided. An electrical contact of a battery may contact an electrical contact of the UAV. The UAV may have recessed region on its body to house the first and/or the second battery. FIG. 3 shows an example of a UAV 301 with a recessed region 302 configured to house a first battery 303 in the body of the UAV 304 and a recessed region 305 to hold a second battery 306. The first battery 303 may be configured to provide power to a propulsion unit and power consuming unit, such as a controller and/or an inertial measurement unit (IMU). The second battery 306 may be configured to power the power consuming unit, such as the controller and/or the IMU. Optionally, the second battery may be configured to not provide power to the propulsion unit. The second battery may provide power to the power consuming unit.

The recessed regions may have equal or non-equal length, width and depth. Possible values for the length, width, and depth of the recessed regions may be at least 1 mm, 5 mm, 1 cm, 3 cm, 5 cm, 10 cm, 12 cm, 15 cm, 20 cm, 25 cm, 30 cm, 35 cm, 40 cm, 45 cm, 50 cm, 55 cm, 60 cm, 65 cm, 70 cm, 75 cm, 80 cm, 85 cm, 90 cm, 95 cm, or 100 cm. The recessed region for the first and second batteries may be of equal or non-equal size. The recessed regions may be configured to hold one or more batteries. The first battery may be configured to be inserted into and removed from a recessed region. The second battery may be configured to be inserted into and removed from a recessed region. Optionally the second battery may be fitted inside of a recessed region and may not easily be removed from the recessed region. A first battery may be configured to be swapped at an energy provision station. A second battery may be configured to remain in a recessed region while a UAV is landed at an energy provision station.

The recessed regions may contain electrical contacts to connect the battery to the UAV power system. Additionally the recessed regions may comprise electrical connections to communicate with a sensor which may dynamically read and record the remaining charge on the battery. The recessed regions may include one or more electrical contacts that may be in electrical contact with the battery onboard the UAV. The electrical contacts may be coupled to the battery while it is inside of the recessed region, if the battery is removed the contact may be disconnected from the battery.

The UAV may comprise an onboard battery system which may consist of a first battery and a second battery. The first battery may be the primary power source and the second battery may be a backup power source. The second battery (backup power source) may provide power to the UAV while the first battery is not coupled to the UAV, for example while the first battery is removed for charging. The first battery may provide power to the propulsion unit and to a controller and/or an inertial measurement unit (IMU). The second battery may be configured to provide power to the controller and/or the IMU. The UAV may operate in two modes such that in the first mode the first battery provides power to the propulsion unit and the controller and/or IMU. Additionally the first battery may be electrically connected to the second batter in the first mode such that the first battery can charge the second battery. The first battery may charge the second battery while the UAV is in flight or while the UAV is landed. In a second mode the first battery may not provide power to the propulsion unit and the second battery may provide power to the controller and/or IMU and not to the propulsion unit. The second mode may require that the UAV is landed. During the second mode operation the first battery does not provide power to any system on the UAV, the first battery may be removed from the UAV while the second battery provides continuous power to the controller and/or IMU.

The battery system on board the UAV may switch between a first and second mode. The system may switch from the first mode to the second mode prior to or upon removal of the first battery. The system may switch back from the second mode to the first mode when the first battery is coupled to the UAV and prepared to provide power to the UAV. Alternatively the system may be switched from the first mode to the second mode without removal of the first battery from the UAV, for example the system may be switched to the second mode when the UAV is landed and the propulsion system is turned off.

Figure 4:
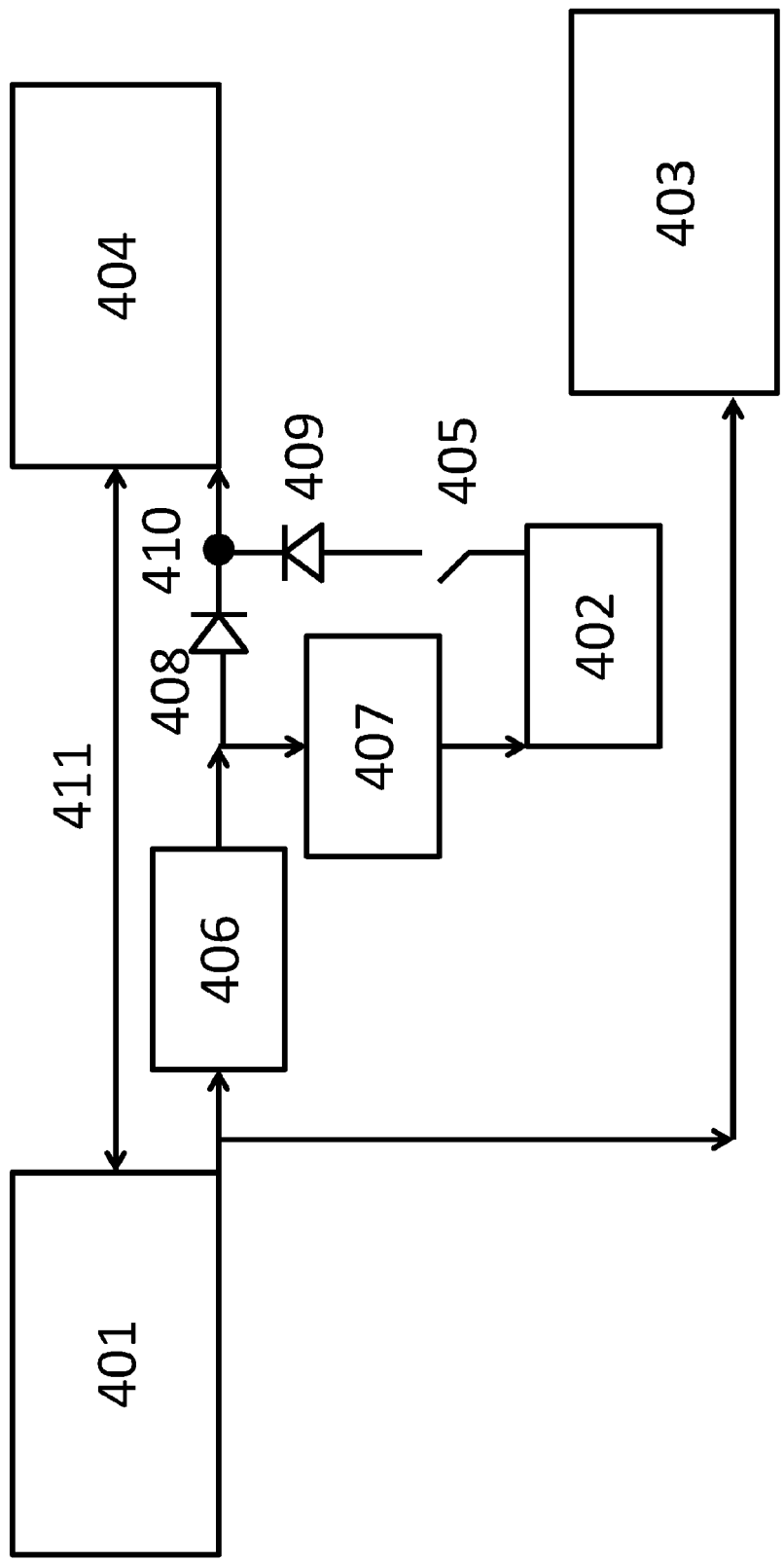
FIG. 4 shows a schematic of a first and second battery system.

FIG. 4 shows a schematic of a preferable battery or power system onboard the UAV. The system has a first battery 401 and a second battery 402 any additional number of batteries may be provided. The first battery 401 may be a higher voltage battery than the second battery 402. The first battery 401 may provide power directly to the propulsion system 403. The first battery 401 may further provide power to the power consuming unit 404 through an electrical path including a first diode 408. The first diode may permit flow of current only in one direction, for example from the first battery 401 to the power consuming unit 404. A voltage regulator module (VRM) 406 may be placed in the circuit between the first battery 401 and the power consuming unit 404. A second battery 402 may be electrically connected to the power consuming unit 404. The second battery 402 may have a second diode 409 in the electrical line between the second battery 402 and the power consuming unit 404. The electrical line leaving the first diode 408 and the electrical line leaving the second diode 409 may intersect at a point 410 and a single electrical line may continue from the intersection point 410 to the power consuming unit 404. A switch 405 may be placed between the second battery 402 and the second diode 409. During operating conditions the switch 405 may remain closed.

The first 408 and second 409 diodes may operate as a control system to switch between the first 401 and second 402 batteries. For example the first battery 401 may have a higher voltage than the second battery 402. In this case the voltage at the first diode 408 and at the location in the circuit before the power consuming unit 404 may be higher than the voltage of the second battery. Current may not flow to the second battery 402 because the second diode 409 may not permit flow of current in the direction from the intersection point 410 to the second battery 402. As long as the voltage of the first battery 401 remains greater than that of the second battery 402 only the first battery 401 will provide power to the power consuming unit 404. As the charge or voltage on the first battery depletes the voltage of the first battery 401 may diminish such that the second battery 402 may be able to provide more voltage relative to the depleted first battery. In this case the second battery 402 will provide power to the power consuming unit 404. In some embodiments, the first diode may have a positive end that may be on the side of the diode in communication with the first battery. The first diode may have a negative end that may be on the end of the diode facing the power consuming unit. Optionally, the second diode may have a positive end that may be on the end of the diode in communication with the second battery. The second diode may have a negative end that may be on the siding of the diode facing the power consuming unit. This may result in the unidirectional flow of current through the diode.

The circuit shown in FIG. 4 may be configured to automatically switch from a first mode in which a first battery provides power to a propulsion system and a power consuming unit to a second mode in which a second battery provides power only to a power consuming unit while a first battery does not provide power to a power consuming unit. In an example, the first battery may have a higher voltage than a second battery such that the first battery may supply a consistent voltage of 5.1 volts (V) to the power consuming unit. The second battery may have a voltage of 5V. While the first battery is able to supply a voltage of 5.1V the second battery may not be permitted to provide power to the power consuming unit. If the charge on the first battery depletes such that the first battery can no longer provide a voltage of 5.1 V, for example the first battery may only be able to provide 4.7V with a given amount of charge, the second battery may provide relatively more charge than the first battery in a depleted state. In this case the second battery may provide power to the power consuming unit. Recharging the first battery may reverse the described procedure, for example if the first battery is recharged the first battery may be able to provide a consistent power of 5.1V and the system may return to a condition in which the first battery provides power to the propulsion system and the power consuming unit while the second battery may not provide power to a component on the UAV until the first battery is depleted.

When the UAV is not in operation both the first battery 401 and the second battery 402 may electrically disconnected from the system components of the UAV such that the batteries do not provide power to the system components when the UAV is not in operation. The second battery 402 may be electrically disconnected from the system by opening the switch 405. The first battery 401 may similarly be disconnected from the system electrically by another switch not shown in the diagram.

In another embodiment the system shown in FIG. 4 may function without the diodes. For example in this case, the first battery may provide power to the propulsion unit 403 and to the power consuming unit 404. In the first mode the switch 405 may be open such that the second battery 402 is electronically isolated from the power consuming unit 404. In the first mode the first battery 401 may provide power to both the propulsion unit 403 and to the power consuming unit 404. The first battery may be higher voltage than the second battery, a voltage regulator module 406 may be included in the system to step down the voltage from the first battery before powering the controller and/or IMU. In a second mode of operation the switch 405 may be closed such that the second battery is electrically connected to the power consuming unit.

The system may have a charging control unit 407 between the first and second batteries. The charging control unit 407 may control charging of the second battery by the first battery. Additional batteries may be included in the system beyond the first and second batteries. Additional batteries may be configured to be extra backup batteries. The additional backup batteries may be used when both the first and second batteries are depleted. The additional backup batteries may be configured to provide charge to the first and second batteries and/or components on the UAV. The battery system described herein may provide continuous power to the UAV while in operation (e.g. while in flight or while landed).

In some instances, a communication link 411 may be provided between the first battery 401 and a power consuming unit 404. The power consuming unit in communication with the first battery may optionally be a controller. The first battery may optionally be an intelligent battery. Circuit control may occur. In some embodiments, the controller may query the first battery about its state of charge, or how much power remains in the battery. The first battery may respond to the controller and provide information that can be used to determine the first battery's state of charge, or how much power remains in the battery.

The method of swapping of a battery on a UAV by an energy provision station may include the steps of landing the UAV at the energy provision station, providing power to the UAV using a power unit such that the UAV remains powered during the swapping of the battery, removing an on-board battery from the UAV using a component of the energy provision station, exchanging the on-board battery for another battery provided at the energy provision station, coupling the other battery to the UAV, and causing the UAV to take off of from the energy provision station. All or any one of these steps may be fully or partially automated.

Figure 5:
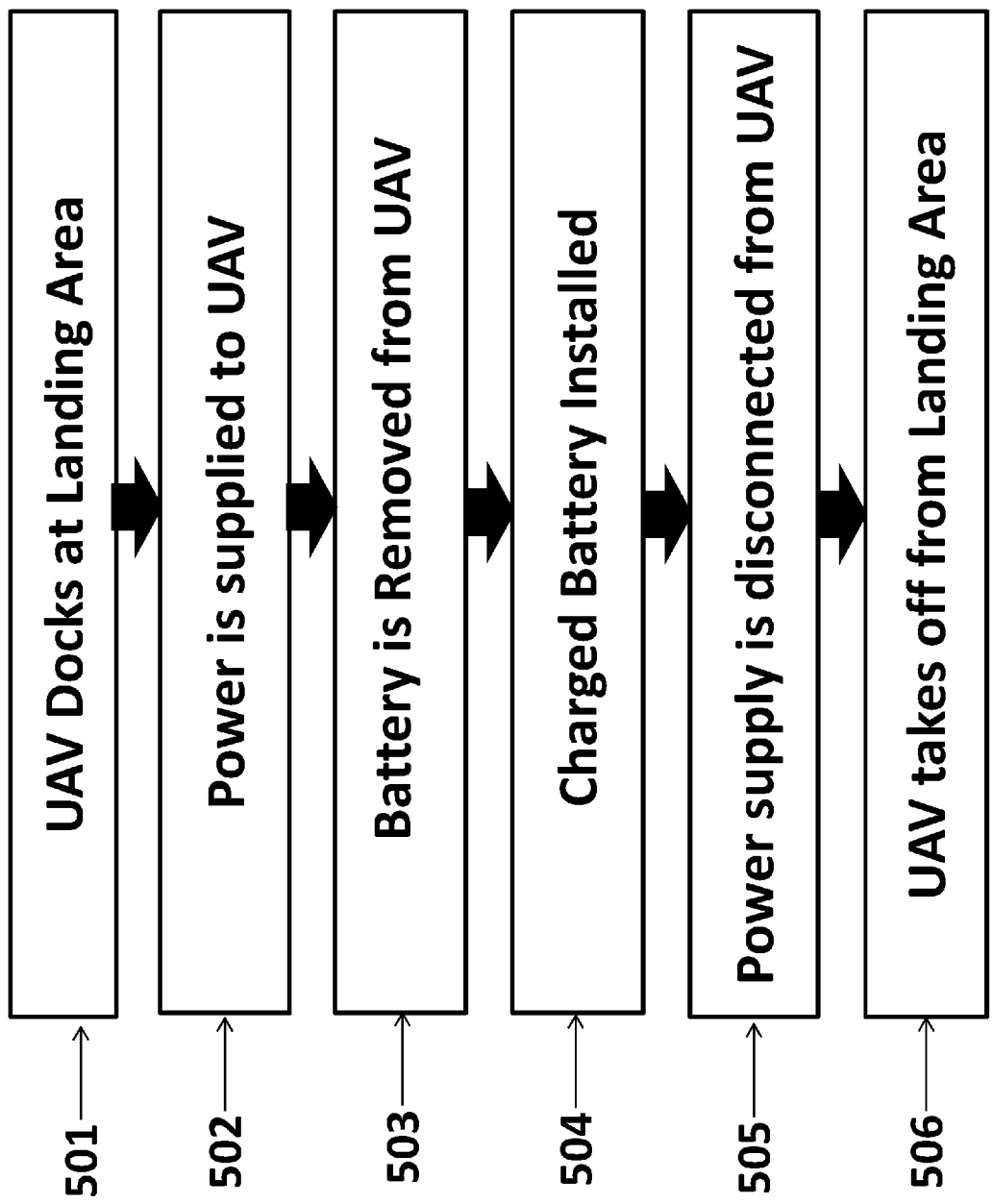
FIG. 5 shows a flow chart of the procedure of charging or exchanging a batter on a UAV while providing continuous power to the UAV.

An example of a method of battery exchange with continuous power to the UAV is shown in the flow chart in FIG. 5. The steps described in FIG. 5 may occur in the order shown, or the steps may occur out of order. The method of battery exchange with continuous power to the UAV may include all of the steps listed or a subset of the steps listed. Initially the UAV may land on a landing area on the energy provision station 501. After the UAV lands, the depleted battery may be removed by a mechanism on the energy provision station 503. Power either from a backup power system on board the UAV (e.g. a second battery on board the UAV) or on board the energy provision system may provide power to the UAV prior to or concurrent with the removal of the depleted battery 502. Upon being removed, the depleted battery may be stored in a battery storage unit. The battery storage unit may comprise a container for the battery, the container may include electrical connections configured to provide charge to the battery. An example of a battery storage area may be a carousel on board the energy provision station. The carousel may be configured such that it may rotate to carry away the depleted battery and place a charged battery in line with a mechanism configured to install the charged battery on the UAV. In some examples, such a mechanism may be a robotic arm. The robot arm that transports the charged battery to the UAV may be the same robotic arm that removes the depleted battery from the UAV. After rotation of the carousel, the robotic arm may install the charged battery in the UAV 504. Once the charged battery is fully installed and able to provide power to the UAV the backup power source may be disconnected from the UAV 505. The final step may be for the UAV to take off from the landing area with a fully charged battery on board 506.

The UAV may communicate with an energy provision station. For example, the UAV may transmit information to the energy provision station regarding the state of the battery on board the UAV, the current flight conditions, time or distance remaining on current mission, battery specifications, battery temperature, UAV specifications, or flight plan. In the case of low battery charge, the UAV may be directed to land at the energy provision station. If the charge of the battery is too low to permit the UAV to meet the UAV's time or distance remaining on the UAV's current mission, or the UAV flight plan, the UAV may be directed to land at the energy provision station. UAV operating parameters, such as expected rate of energy consumption, or current rate of energy consumption, may be taken into account. For example, a UAV may be flying in a relatively 'low power' mode where one or more of the sensors are not in operation, but it may be anticipated that the UAV may employ more of the sensors later in flight. The anticipated increased rate of energy consumption may affect the anticipated rate of battery charge depletion, which may be taken into account when determining whether the UAV needs to land at the energy provision station. Optionally, the UAV may be directed to land at the energy provision station if the state of charge of the battery falls beneath a predetermined threshold.

The UAV may identify an energy provision station landing area by sensing a marking, for example a marking may be a raised pattern, a recessed pattern, an image, a symbol, a decal, a 1-D, 2-D, or 3-D barcode, a QR code, or lights visible on the energy provision station landing area. The marking may indicate that the energy provision station has charged batteries available. For example the marking may be a light or pattern of lights, the lights may be turned on only when the energy provision station has charged batteries available.

The UAV may take off and land on the energy provision station landing area vertically. The landing area may comprise recessed mating features to guide the UAV during landing. The mating features may decrease the need for accuracy when landing the UAV on the landing area. The recessed features may be configured to mate with a wide variety of UAVs, alternatively the mating features may be specific to a single UAV manufacturer, single UAV fleet, or one particular UAV.

Communication between the UAV and the energy provision station may be used to get the UAV to the general location of the energy provision station. Communication between the UAV and the energy provision station may occur wirelessly. The UAV may employ GPS or other locating software to locate the energy provision station. The GPS or other location techniques can be used to get the UAV to the vicinity of the energy provision station. The wireless communications may get the UAV within range to sense one or more portions of the energy provision stations. For instance, the UAV may be brought into a line-of-sight of the energy provision station. The landing area marker or markers may aid in further pinpointing the location of the energy provision station. The marker may serve as a confirmation of the energy provision station on which the UAV may land. The markers may also differentiate the energy provision station or a landing area of an energy provision station from other objects or regions.

The marker may be useful for indicating a landing position of the UAV on the energy provision station. The marker may be used as a fiducial marker, which may aid the UAV in navigating to a proper landing position on the energy provision station. In some examples, multiple markers may be provided which may aid the UAV in landing in a desired position. In some instances, it may also be desirable for a UAV to have a particular orientation when docking with the energy provision station. In one example, the marker may include an asymmetric image or code that may be discernible by the UAV. The fiducial marker may be indicative of the orientation of the energy provision station relative to the UAV. Thus, the UAV may be able to orient itself properly when landing on the energy provision station. The marker may also be indicative of the distance of the energy provision station relative to the UAV. This may be used separate from or in combination with one or more other sensors of the UAV to determine the altitude of the UAV. For example, if the size of the fiducial marker is known, the distance from the UAV to the marker may be gauged depending on the size of the marker showing up in the sensors of the UAV.

In one example, the marker may be provided at a particular location relative to a desired landing spot of the UAV on the energy provision station. This may be at a particular location relative to a desired landing spot on a landing area of an energy provision station. The UAV may be capable of landing on the landing area with great precision. The marker may help guide the UAV to the exact desired spot. For instance, the marker may be located 10 cm in front of the center of the desired landing point of the UAV. The UAV may use the marker to guide the UAV to the exact landing spot. In some examples, multiple markers may be provided. The desired landing spot may fall between the multiple markers. The UAV may use the markers to help orient the UAV and/or position its landing between the markers. Distance between the markers may aid the UAV in gaging the distance of the UAV to the landing area.

The marker may be provided anywhere on the energy provision station or landing area. The marker may be placed in a location such that it is easily discernable from above. In some instances, the marker may be provided on an exterior surface of the energy provision station. The marker may include a wireless signal being emitted by an energy provision station. The origin of the signal may be from outside the energy provision station or inside the energy provision station. Alternatively the energy provision station may emit IR and/or UV light, radio, or audio signals.

The marker may be positioned near where the UAV may dock with the energy provision station. In one example, the marker may be positioned less than about 100 cm, 90 cm, 80 cm, 75 cm, 70 cm, 65 cm, 60 cm, 55 cm, 50 cm, 45 cm, 40 cm, 35 cm, 30 cm, 25 cm, 20 cm, 15 cm, 12 cm, 10 cm, 8 cm, 7 cm, 6 cm, 5 cm, 4 cm, 3 cm, 2 cm, or 1 cm from where the UAV lands on the energy provision station.

Data pertaining to the detected marker may be provided to one or more processors. The processors may be on board the UAV. Based on the detected information about the detected marker, the processors may, individually or collectively, generate a command signal. The command signal may drive the propulsion units of the UAV. For example, the propulsion units may be driven to cause the UAV to land on the energy provision station with the detected marker, when the detected marker is determined to belong to the energy provision station. The detected marker may indicate the state of charge of the stored batteries at the energy provision station. For example if the energy provision station has a fully charged battery available the detected marker may result in a command from the processor to land the UAV. In another example if the energy provision station does not have a charged battery available the detected marker may result in a command from the processor to continue traveling to the next energy provision station. Thus, a UAV may be able to land in an autonomous or semi-autonomous fashion in response to a detected marker. The UAV may be capable of landing without receiving any commands or manual input from a user.

In some embodiments, sensors on board the UAV may be used to detect the marker, and processing may occur on-board the UAV. The UAV may be capable of landing itself on the energy provision station without requiring further guidance or information from the energy provision station once the UAV has confirmed that the marker belongs to the energy provision station.

An energy provision station may include a marker, and one or more coupling connection components. The energy provision station may send information about its location to a UAV. The energy provision station may have a location unit capable of determining positional information. An energy provision station may receive information from the UAV about the location of the UAV and the state of the battery on board the UAV. For example, coordinate information, such as GPS coordinates, for the UAV may be provided to the energy provision station. In another example the UAV may communicate the remaining charge percentage of the battery currently in use on the UAV. The energy provision station may have a communication unit capable of communicating with the UAV. The energy provision station may have a processor capable of identifying and/or calculating a location of the UAV. Furthermore, the energy provision station may have a processor capable of identifying and/or calculating a location of the next nearest battery exchange station. For example a UAV may communicate to an energy provision station that the battery currently on board the UAV has a remaining charge percentage of 18%, the processor at the energy provision station may determine the distance to the next battery exchange station in the UAV's flight path to determine if the UAV should stop for recharging or continue to the next energy provision station.

Figure 6:
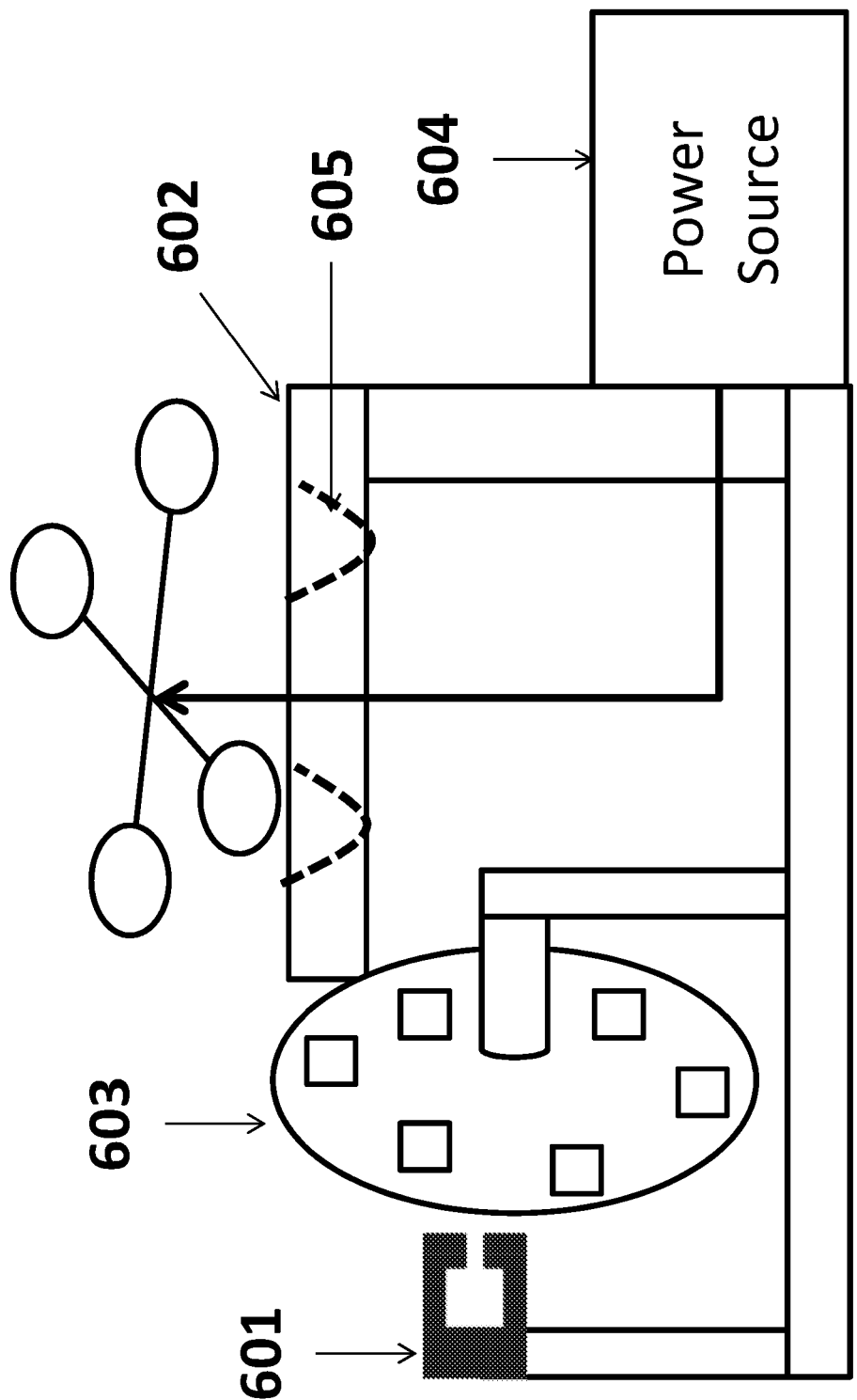
FIG. 6 shows a complete energy provision station.

FIG. 6 shows a possible embodiment of an energy provision station. The energy provision station may have four basic components: a battery replacement member 601, a UAV landing area 602, a battery storage unit 603, and a power source 604. The battery replacement member may be a mechanical arm 601 that may be configured to remove a battery from a UAV and/or to place a charged battery in the UAV. In some instances, the mechanical arm may both remove the battery from the UAV and place a charged battery in the UAV. Alternatively, different mechanical components may be used to remove the battery form the UAV and to place a charged battery in the UAV. The mechanical arm may have at least 1, 2, 3, 4, 5, or 6 degrees of freedom. The mechanical arm may move autonomously or semi autonomously.

The UAV landing 602 area may comprise markers that may be uniquely recognized by an approaching UAV. The landing area may comprise a passive landing guide 605. The passive landing guides may be configured to interact with a component of a UAV as it lands to guide the UAV to a final resting position. The UAV may include a landing stand that may fit into a passive landing guide and be guided to the final resting position. The UAV may include a surface upon which the UAV may land. The UAV may rest on the surface, or all or a majority of the weight of the UAV may be borne by the passive landing guides.

The battery storage unit 603 may store a plurality of batteries. The battery storage unit may simultaneously store and charge the stored batteries. The battery storage unit may move the batteries relative to each other. The battery storage unit may move the batteries relative to the UAV landing area and/or a UAV on the landing area. Multiple batteries may be moved simultaneously using the battery storage unit. When a UAV lands on the energy provision station, a fully charged battery may be in a location such that the mechanical arm 601 may install the battery on the UAV. For instance, a mechanical arm may bring a depleted battery from a UAV to a particular location relative to the battery storage unit. The battery storage unit may accept the depleted battery. The battery storage unit may cause movement of the batteries so that a different battery (e.g., fully charged battery) is moved to the location where the depleted battery was accepted. The mechanical arm may receive the different battery. In some instances, the movement may include rotation of the battery storage unit about an axis.

The power source 604 may be a battery, a connection to distributed power, or an on board renewable energy source. Examples of on board renewable energy sources may include at least one wind turbine, hydro turbine, or solar generator. The power source may provide power to the UAV while a battery on board the UAV is being swapped for an alternate battery with a higher remaining charge. The power source may provide power to the propulsion system and the controller and/or IMU or the power source may provide power to the controller/IMU or other power consuming unit only. The power source may provide continuous power to the UAV. Alternatively continuous power may be provided to the UAV from a backup power source or battery on board the UAV. The backup power source on board the UAV may operate in a way similar to the method described in FIG. 4 such that the system may operate in a first and second mode. In the first mode a first battery may provide power to the propulsion unit and the controller and/or IMU. In a second mode the UAV may land on an energy provision station and the second battery may provide power to the controller and/or IMU or other power consuming unit while the first battery is removed for charging to be replaced with a fully or partially charged battery. The power system described herein may provide continuous power to one or more power consuming units on board the UAV. It may be advantageous to provide continuous power to these components because they may have settings and/or data storage which may be lost when they lose power.

Figure 7:
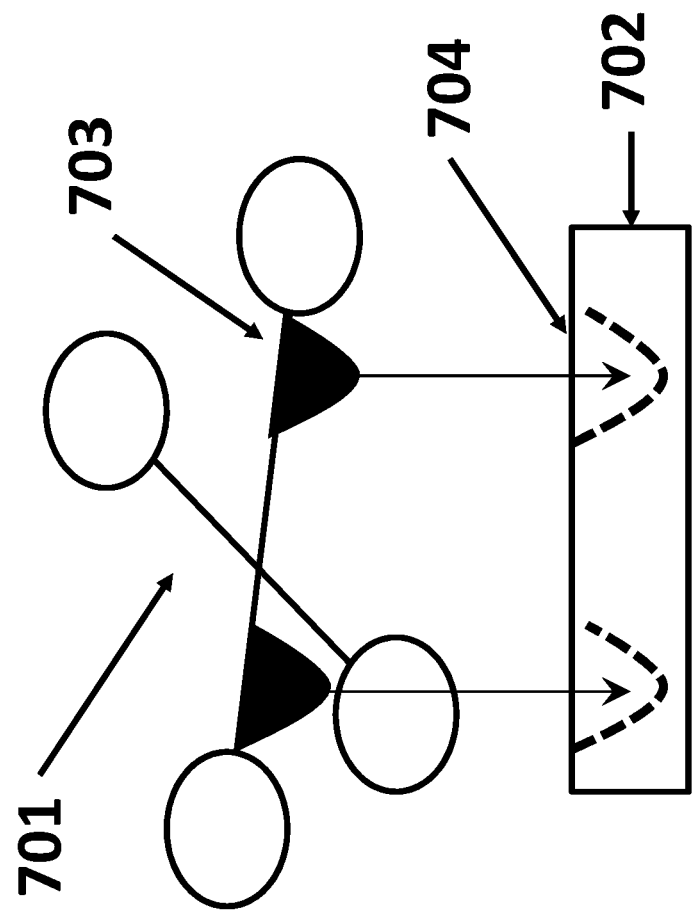
FIG. 7 shows an example of a landing guide on the landing area of a energy provision station.

The UAV landing area of the energy provision station may be configured to comprise a passive landing guide. The UAV may have at least one protruding feature which may mate with a corresponding cavity on the landing area of the energy provision station. For example the UAV may have four round conical stoppers which may fit inside of four round conical indentations on the landing area. The protruding feature may be a launch stand configured to bear a weight of the UAV. FIG. 7 shows an example of a UAV 701 landing on an energy provision station 702 such that the conical stoppers 703 mate with the conical indentations 704 on the landing area. In an alternative embodiment, the stopper and the indentation may comprise a variety of other mating shapes. The stopper may be made from rubber, plastic, metal, wood, or composite. The stopper may have a height and width of less than or equal to 1 mm, 5 mm, 1 cm, 3 cm, 5 cm, 10 cm, 12 cm, 15 cm, 20 cm, 25 cm, 30 cm, 35 cm, 40 cm, 45 cm, 50 cm, 55 cm, 60 cm, 65 cm, 70 cm, 75 cm, 80 cm, 85 cm, 90 cm, 95 cm, or 100 cm. The indentations may have corresponding dimensions such that they are adapted to fit the stopper.

In another example the UAV may comprise a protrusion that does not identically mate with an indentation on the landing area. In this example, the UAV may have a feature protruding from the bottom of the UAV designed such that it is smaller than the indentation on the landing area. The protruding feature on the bottom of the UAV may fit into the indentation. In a specific example of this configuration, the UAV may have a protruding rod and the landing area may have a conical indentation. Upon landing, the protruding rod may be funneled into the bottom of the conical indentation. For instance, if a protruding rod hits a side of the indentation, gravity may cause the protruding rod to slide to the bottom of the indentation. FIG. 8 shows a detailed side (left) and top (right) view of a possible embodiment of the landing area 801 with a docked UAV 802 showing a protruding rod fitting inside of a conical indentation 803. Optionally, the protruding rod may be a landing stand of the UAV. The protruding rods may bear the weight of the UAV while the UAV is resting on the landing area. The indentations may bear the weight of the protruding rods and/or the UAV while the UAV is resting on the landing area.

The passive landing guide may reduce the need for high precision control of the UAV landing procedure. The passive landing guide may be configured such that the UAV may corrected if it approaches the station in such a way that it is off set from the desired landing location. The passive landing guide may bring the UAV into the desired location with the aid of gravity. FIG. 9 shows an example of how the passive landing guide may correct the UAV if it approaches the landing location with an off set. In the example shown in FIG. 9 the UAV approaches the landing guide off set to the right (1). The UAV partially mates with the passive landing guide, after contact with the landing guide the UAV may slide downward into the correct location (2). This process of correcting the UAV to the correct landing location may rely on gravity and may not introduce a need for a moving part or additional mechanism.

The energy provision station may comprise a battery storage system. The battery storage system may be a carousel. The batteries in the battery storage system may be fully charged, partially charged, or depleted of charge. The batteries may be connected to a source of electrical power to restore them from a depleted or partially charged state to a state of full charge. The batteries may be identical in size, shape, and battery type (e.g. lithium ion, nickel cadmium). Alternatively, different battery sizes, shapes or types may be accommodated. The battery storage system may be configured to store at least 2, 3, 4, 5, 6, 7, 8, 9, 10, 15, 20, 25, 30, 35, 40, 45, or 50 batteries. In some embodiments, the battery system may store less than any of the number of batteries described. The battery system may store a number of batteries falling within a range between any two of the values described.

The battery storage system may comprise individual ports for each battery. The ports may be movable relative to each other. Multiple ports may move simultaneously. The ports may rotate about an axis clockwise, counterclockwise, or in both rotational directions. The axis of rotation may be horizontally oriented (e.g., parallel to an underlying surface or ground, perpendicular to the direction of gravity), or vertically oriented (e.g., perpendicular to an underlying surface or ground, parallel to the direction of gravity). The ports may translate in any direction. Optionally, they may translate and rotate simultaneously. The ports may have electrical connections which may connect to the processor to meter the charge available on the battery or they may connect to an electricity source to charge the battery. The electricity source may be on board or off board the energy provision station. For example the electricity source may be an electric generator, a rechargeable battery, a disposable battery, or a connection to a distributed power line. The energy provision station may be permanently installed or it may be temporary. In the case of a temporary energy provision station, the station may be configured to be portable and may be carried away by a user.

Figure 10:
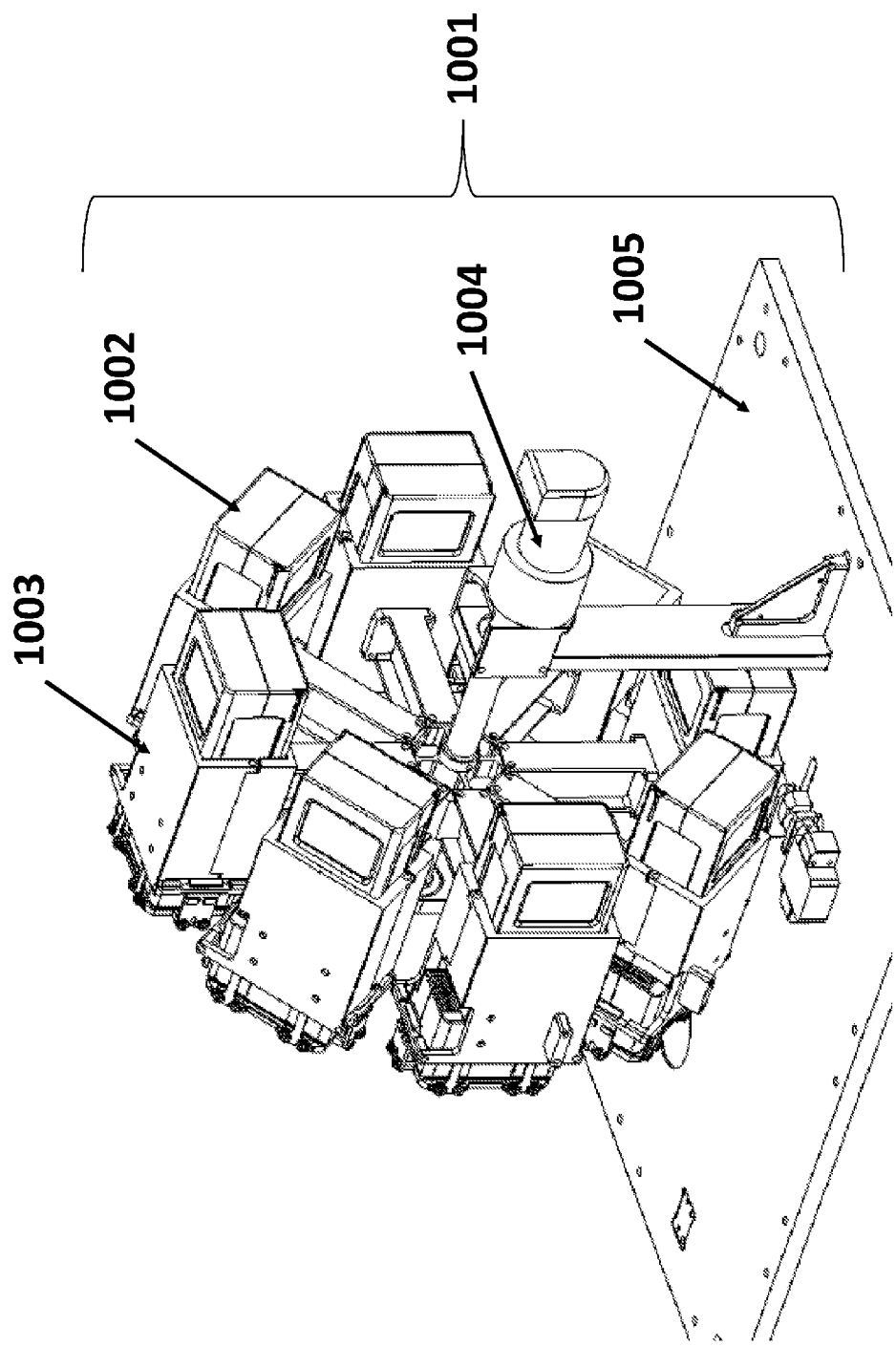
FIG. 10 shows an example of a battery storage carousel.
Figure 11:
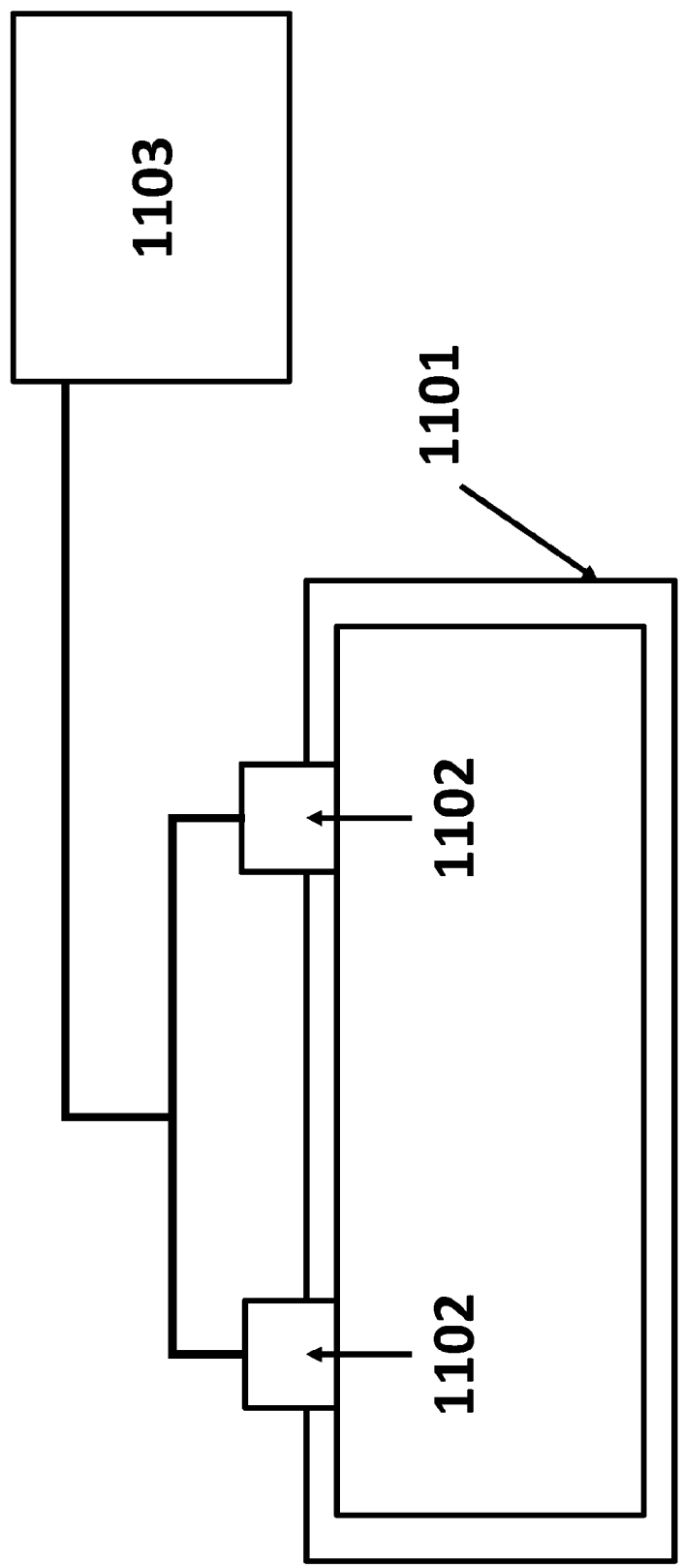
FIG. 11 shows an example of a battery storage container.

The stored batteries may move relative to each other. In one example the batteries may move relative to each other in a carousel. FIG. 10 shows an example of a possible battery carousel 1001 for use in the battery storage system. The carousel shown in FIG. 10 can hold 8 batteries 1002. Alternatively a carousel may be chosen such that it can hold at least 4, 5, 6, 7, 8, 9, 10, 15, 20, 25, 30, 35, 40, 45, or 50 batteries. The carousel may be configured to hold fewer batteries than values described herein or the carousel may be configured to hold a number of batteries within a range between any two of the values described herein. The batteries in the carousel may be identical in size, shape, voltage, and composition. Each battery may be stored in a compartment 1003. The battery may slide in and out of the compartment during installation and removal from a UAV. For instance, the battery may slide in and out laterally via a side opening of the compartment. The battery may be able to lock into the compartment during storage. A battery may be charged on board the UAV or a battery may be charged in the storage compartment in the battery storage system. The battery storage compartment may be configured to provide electrical charge to the battery through electrical contacts. FIG. 11 shows an example of a possible battery storage compartment 1101 with electrical contacts configured 1102 to provide charge to a battery. The electrical contacts may be connected to a power source 1103 off board the battery. The battery may be simultaneously connected to a meter to determine when the battery charge is complete. The container may provide only enough electrical power to charge or partially charge the stored battery. The battery storage compartment may be part of a carousel or other battery storage unit. The battery storage compartment may be movable relative to other portions of an energy provision station.

Figure 12:
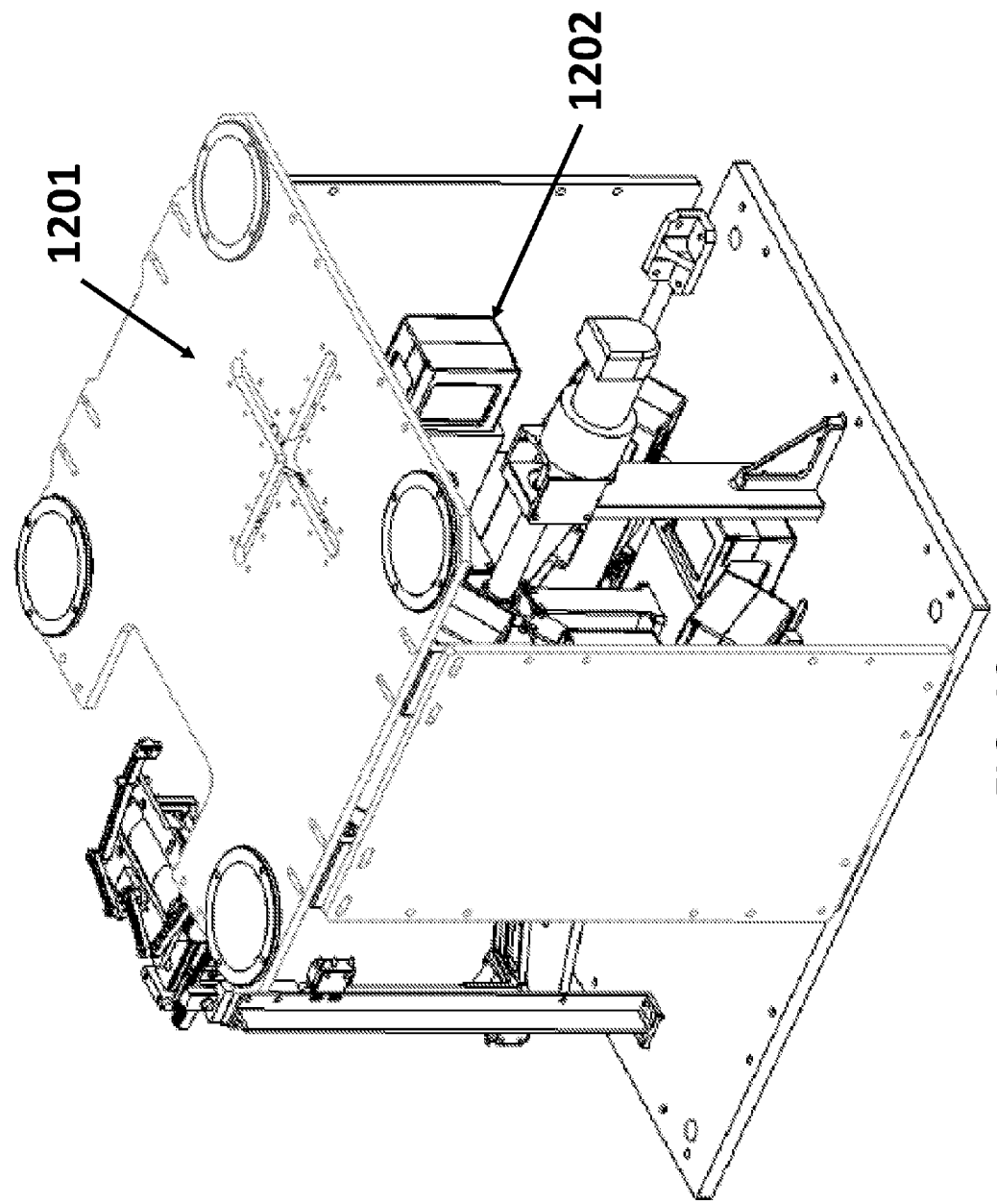
FIG. 12 shows an example of a battery storage carousel located below the landing area.

The battery carousel 1001 may rotate about a shaft 1004. The carousel may rotate counterclockwise or clockwise. The carousel may be able to rotate in either both directions or only one direction. The rotation may be driven by an actuator, such as a motor. The actuator may receive a command signal from a controller on-board or off-board the energy provision station that controls movement of the battery storage system. The carousel may be configured perpendicular to the base of the energy provision station 1005. For instance, the length of the shaft may be parallel to the base of the energy provision station. Alternatively the carousel may be oriented parallel to the base of the energy provision station or at any other angle relative to the base of the energy provision station. FIG. 12 shows a possible embodiment of the complete energy provision station. FIG. 12 shows that the landing area 1201 may be placed on top of the carousel 1202. The battery carousel may be partially or completely enclosed by a housing.

The battery storage system may be driven by an actuator to rotate. The battery storage system may include a steering lock, so that the battery storage can be locked when needed to prevent it from rotating and fix it at the desired position. The steering lock may be located at the bottom of the carousel, the top, or along the sides.

The energy provision station may comprise a mechanism configured to move the batteries. The mechanism may be an automated battery replacement member. The mechanism may be a robotic arm, actuator, or a pulley. The mechanism may be a mechanical elevator. In one embodiment, the mechanism configured to move the batteries may be a robotic arm. The robotic arm may have at least 2 degrees of freedom. For example a robotic arm having 2 degrees of freedom may be able to move (1) horizontally and (2) vertically. The up and down motion may be achieved by a linear actuator, or any other type of actuator. The horizontal motion may be achieved by a rack and pinion mechanism driven by an actuator. The horizontal motion may be a linear motion. The horizontal actuator may be installed on a vertical motion actuator such that the robotic arm may vertically and then horizontally. Optionally, the robotic arm may permit a battery to move vertically and/or horizontally without causing any rotation of the battery. The battery may be translated without being rotated by the robotic arm. In alternative embodiments, the robotic arm may permit rotation or change in orientation of the battery.

The mechanism configured to move the batteries may comprise an end member adapted to attach to the battery to be removed from the UAV. For example the end member may be a magnet, a hook, or a suction device. In a preferred embodiment the end member may be a clamp. The clamp may be installed on the forward and back module such that the robotic arm may move forward or back and then clamp or release a battery. The clamping motion may be driven by a steering gear and linkage system. The clamp may attach to the battery by compressing the battery between two sides of the clamp with sufficient pressure to hold the battery, alternatively the battery and the clamp may comprise complimentary mating features. An example of a complimentary mating feature may be a peg and a hole. Similar mating features may be used to hold the batteries in the battery storage unit.

Figure 13:
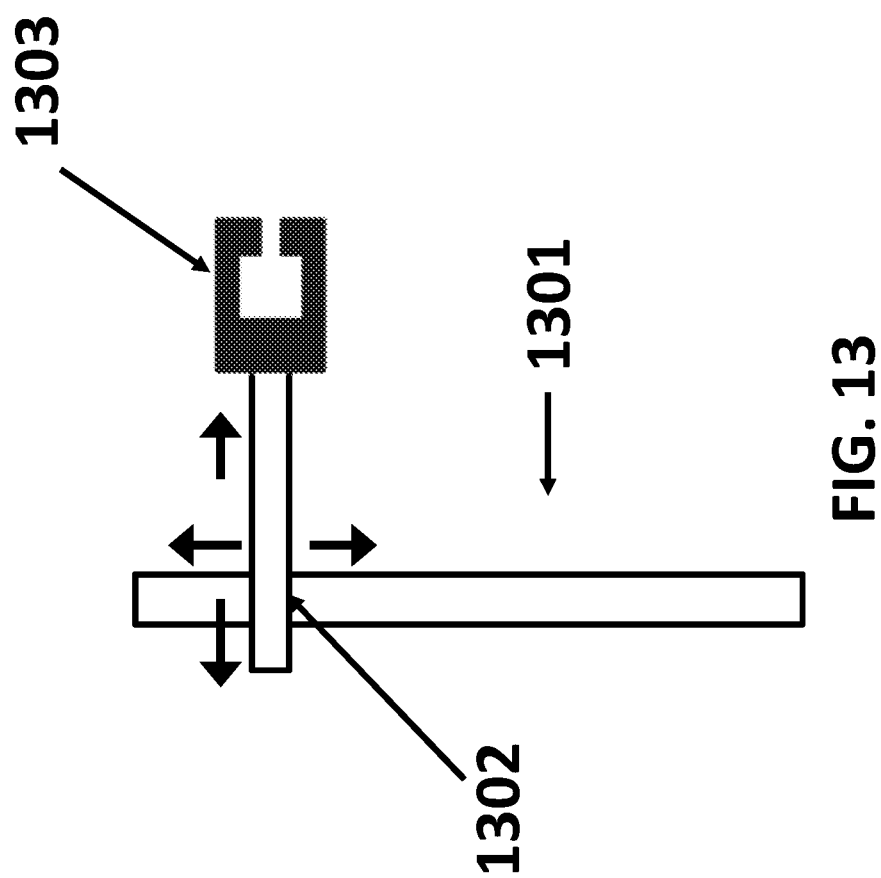
FIG. 13 shows the components of a possible mechanism to swap the battery on a UAV.

FIG. 13 shows a schematic of a possible robotic arm. The robotic arm may be raised from the base of the energy provision station by a post 1301. The robotic arm may be configured to move up and down along the post. The robotic arm may move up and down autonomously or semi autonomously. The robotic arm may be attached to the post via a second rail 1302 on which it may be configured to move forward and back. The robotic arm may move forward and back autonomously or semi autonomously. The third feature of the robotic arm may be a terminal clamp 1303. The terminal clamp may have a c shaped opening which may open towards the recessed battery of a docked UAV. The terminal clamp may open and close, it may be able to attach to a battery.

Figure 14:
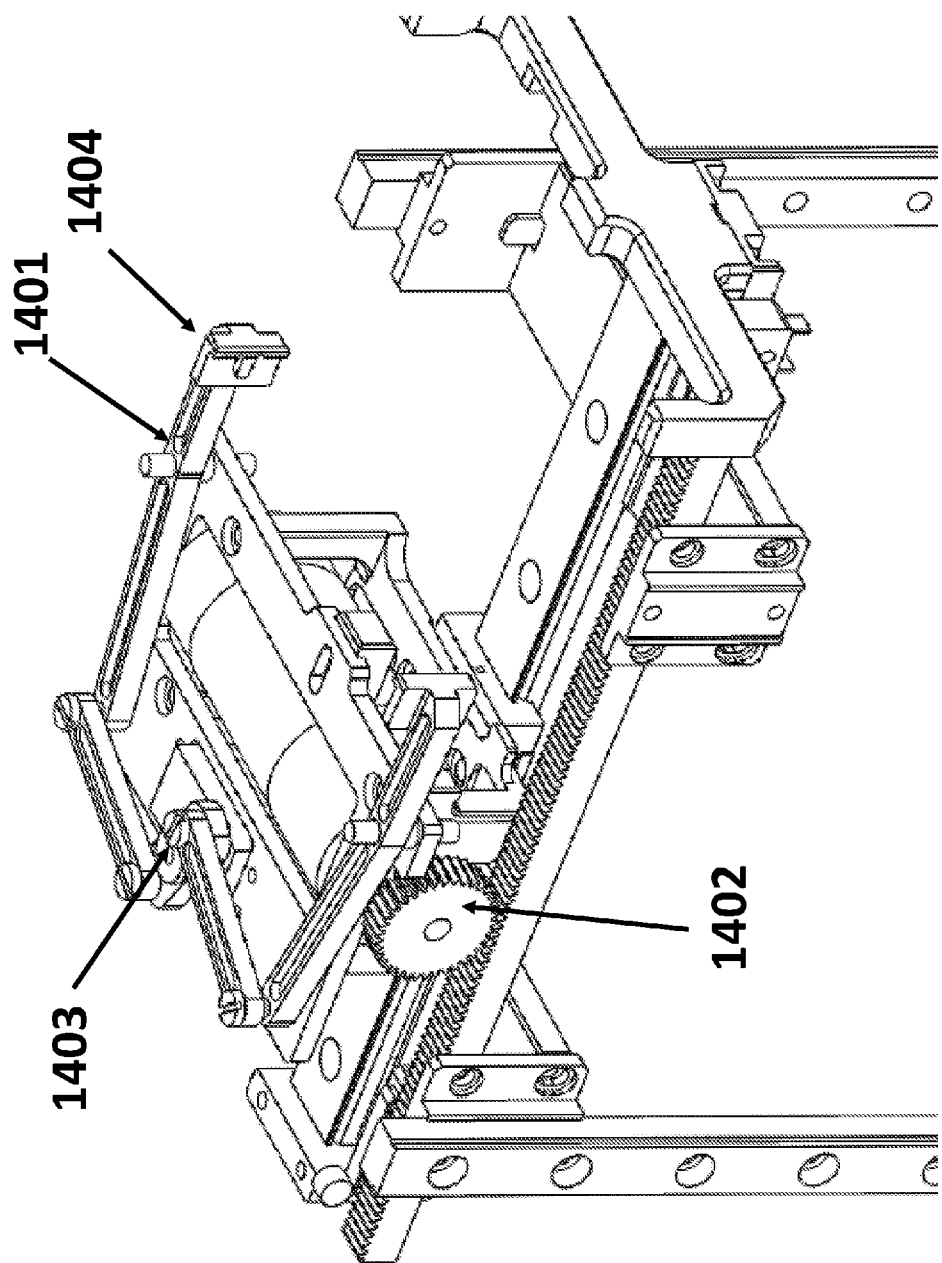
FIG. 14 shows an embodiment of a robotic arm clamp for swapping a UAV battery

FIG. 14 shows a detailed view of an embodiment of a robotic arm. The example shown in FIG. 14 depicts a clamp 1401 mounted on a rack and pinion mechanism 1402. The clamp may be oriented horizontally, so that ends of the clamp grid onto the sides of the battery. The clamp may include a portion in the rear 1403 that may rotate, thereby causing the ends of the clamp 1404 to move closer together or further apart. The rear control portion may rotate with aid of an actuator that may operate in response to a command signal from a controller on-board or off-board the energy provision station.

Figure 15:
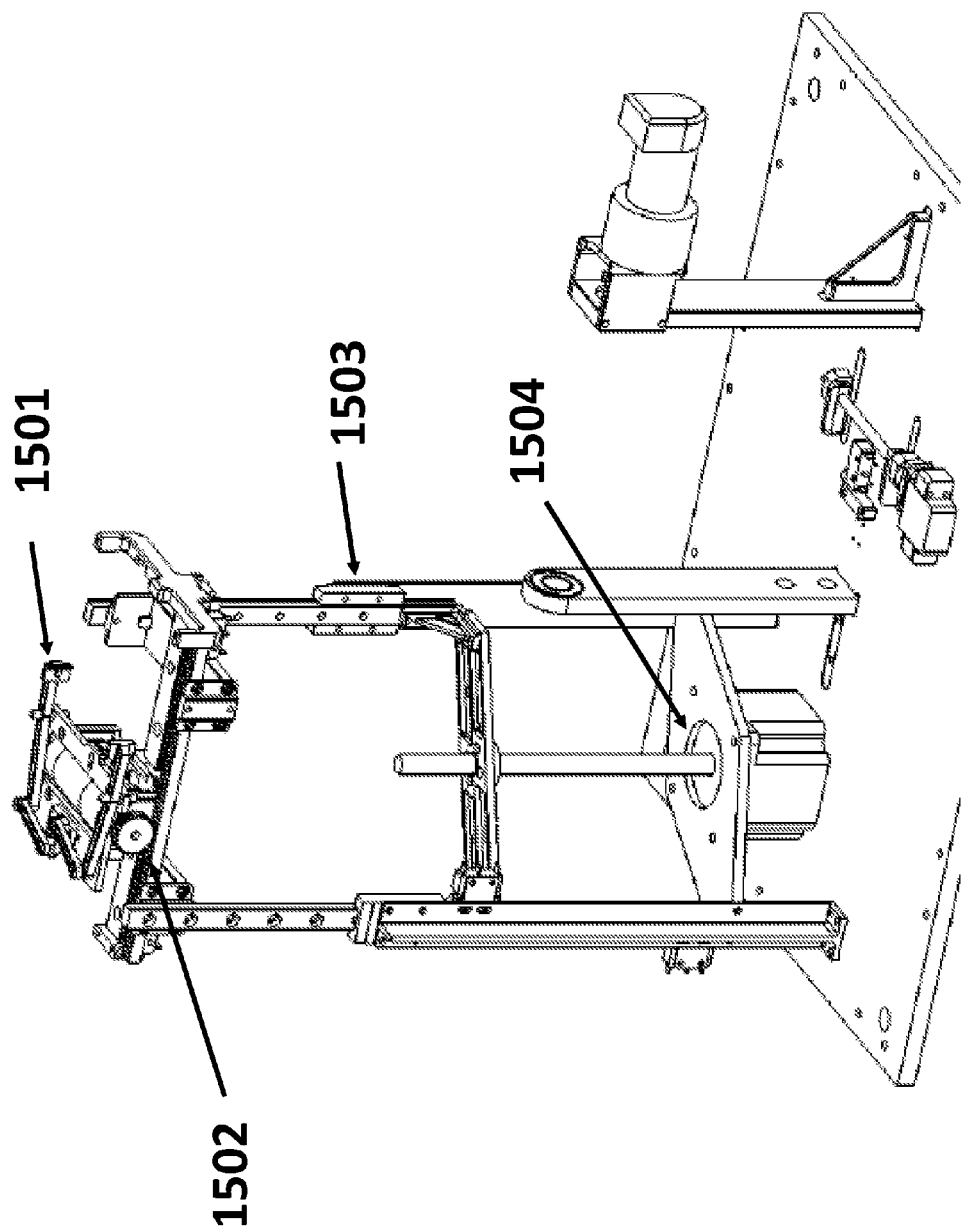
FIG. 15 shows a detailed example of a mechanism for swapping a UAV battery

FIG. 15 provides a complete view of the robotic arm including the clamp 1501 mounted on a rack and pinion mechanism 1502. The assembly comprising the clamp and rack and pinion supported on an actuator 1503 configured to move the assembly in a vertical up and down path. In addition to vertical motion the entire assembly may also be rotated clockwise or counterclockwise about a pivot point 1504. The pivot point may be oriented so that the entire assembly may rotate about a vertical axis of rotation. This may permit the assembly to change orientation. In some instances, the assembly may rotate about a limited range. In some instances, the robotic arm may not rotate about an axis, it may be fixed rotationally.

Prior to or concurrent with removing a battery from a UAV by the mechanism configured to move the batteries the UAV may be connected to a backup power source such that continuous power is provided to the UAV during the battery swapping procedure. The backup power source may be a battery or a renewable energy generation power source on board the UAV. Alternatively the backup power source may be a connection to distributed power by an electrical line (e.g. power grid connection), a battery, or a renewable energy source on board the energy provision station. The backup power source may provide power to the UAV through an electrical connection. The backup power source may provide power to the UAV before during and after the first battery is decoupled from the UAV. The backup power source may have a higher level of charge or available voltage than the battery removed or decoupled from the UAV during that battery swapping procedure.

A system may comprise two possible backup power sources such that a first backup power source may be a battery and a second backup power source may be a renewable energy generator. The backup power sources may be configured to supply power to the UAV before during and after a first battery is decoupled from the UAV A processor on board the energy provision station or on board the UAV may instruct the system to use either the first backup power source or the second backup power source based on a reliability assessment. The first backup power source may be a battery on board the UAV. The reliability of the first energy source may be proportional to the charge remaining on the battery. For example, if the charge remaining on the battery is below a predetermined threshold the battery may be considered as having low reliability. The second backup power source may be a power source on board the energy provision station. The second backup power source may be a battery. The reliability of the second energy source may be proportional to the charge remaining on the battery. Alternatively the second backup power source may be a renewable energy generator. In the case that the second backup power source is a renewable energy generator the reliability of the second backup power source may be proportional to the consistency of the power source. The consistency of the power source may correspond to the power generation supplied by the source over a fixed interval of time. For example, when the backup power source is a solar energy generator the processor may determine that the power source has high reliability on a sunny day and low reliability during cloudy conditions or at night. In another example, when the backup power source is a wind turbine the processor may determine that the power source has high reliability during times of high and consistent wind conditions and low reliability on calm days.

The processor may instruct the energy provision system and/or the UAV to provide power to a UAV using the power source with higher reliability. Alternatively the processor may be programed to provide power to a UAV using a predetermined default backup power source. The use of a default backup power source may be contingent on the default power source having a reliability above a predetermined threshold value. For example, the first backup power source may be the default backup power source, this power source may be chosen to provide backup power to the UAV such that it has a reliability above a predetermined threshold. When the default backup power source has a reliability below the predetermined threshold a second backup power source may be used. The first or second backup power source may provide power to the UAV during a battery swapping procedure such that the UAV remains powered continuously including a time period while no battery is coupled to the UAV. A first battery may be decoupled from the UAV using a battery replacement member. The first battery may be configured to not provide power to the UAV while it is decoupled from the UAV. While the first battery is decoupled from the UAV, the backup power (or energy) source chosen by the processor may provide power to the UAV.

Figure 16:
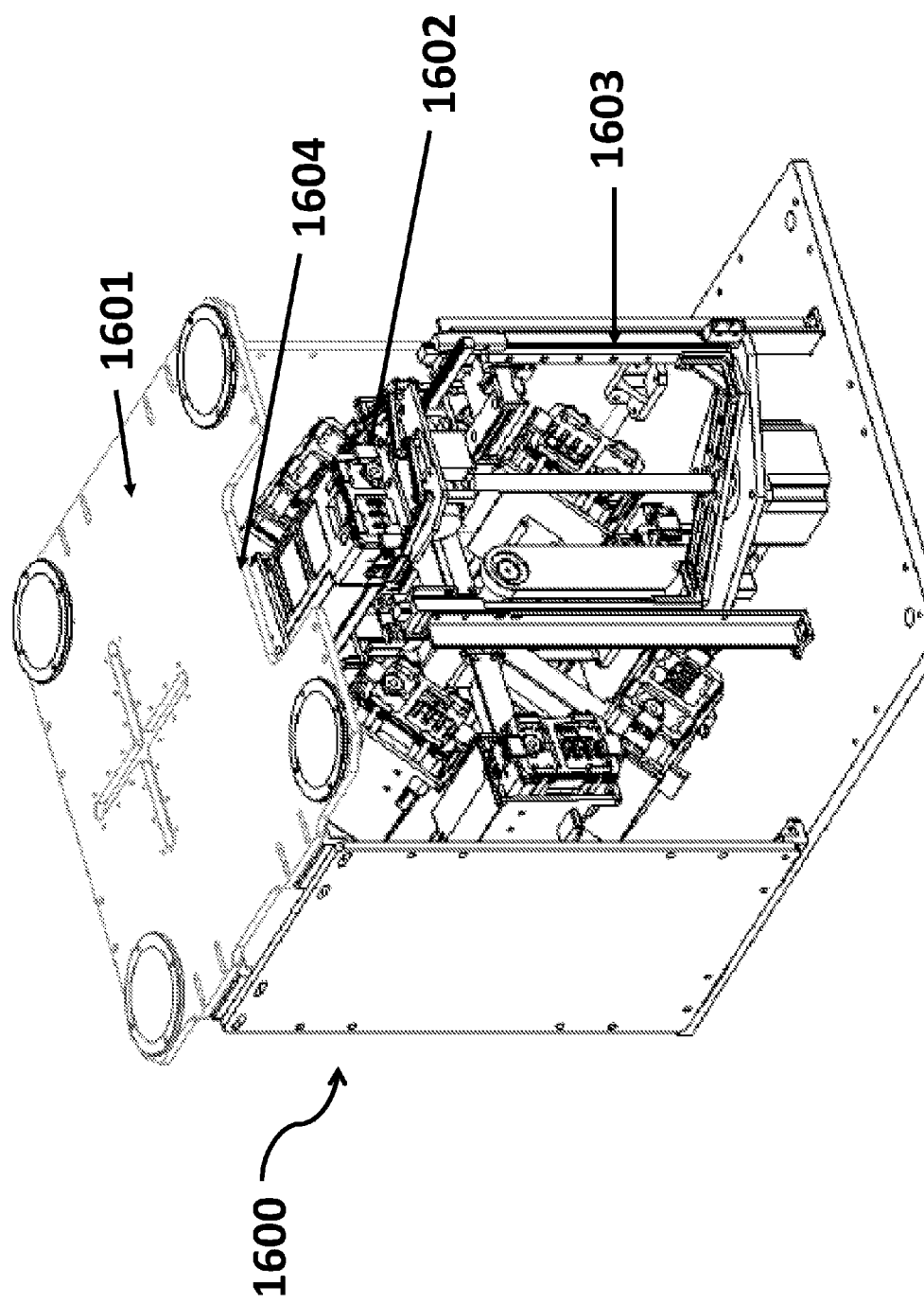
FIG. 16 shows an example of a complete energy provision station.

FIG. 16 shows the complete energy provision station assembly including the landing area 1601, battery storage system 1602, and the robotic arm 1603. In the embodiment shown in FIG. 16 the battery storage system is below the landing area and the robotic arm is adjacent to the battery storage system and landing area such that it is adapted to access both regions of the energy provision station. The robotic arm may move vertically between the UAV landing area and the battery storage system while performing a battery switching procedure. Optionally, a notch or opening 1604 may be provided on the UAV landing area that may permit the robotic arm and/or battery to traverse the region between the UAV landing area and the battery storage system.

A UAV may locate an energy provision station from the air. Upon locating the energy provision station the UAV may communicate with the energy provision station to determine if the UAV should approach and land on the energy provision station to initiate a battery switching procedure. A battery life reloading procedure may initiate when a UAV docks on the landing area of an energy provision station. Reloading battery life on a UAV may include increasing the overall battery state of charge for the UAV. This may include (1) recharging the existing battery while the battery is on-board the UAV, (2) removing the existing battery from the UAV, recharging the existing battery off-board the UAV, and coupling the existing battery back with the UAV, or (3) removing the existing battery from the UAV, taking a new battery with a higher state of charge, and coupling the new battery with the UAV. The UAV docked on the landing area may communicate with a processor on board the energy provision station. Alternatively, the UAV may communicate remotely with a processor off board the energy provision station. The processor may determine the remaining charge on the battery currently in use on the UAV by communicating with a sensor in contact with the battery. The remaining charge on the battery may be sensed by a voltmeter. Based on the % of remaining charge on the battery the processor may initiate a response which may include swapping the battery for a fully charged battery from the storage system or charging the current battery. The decision to charge or swap the battery onboard the UAV may be based on a threshold percentage of remaining charge. The threshold value may be 50%, 40%, 30%, 20%, 10%, or 5% remaining charge. The threshold may be fixed, or it may be variable as a function of battery age, battery type, flight conditions, ambient temperature, or distance to the next energy provision station. After determining an optimal response the battery swap or charge may take place at the energy provision station. When the battery swap or charge has completed the processor may indicate that the UAV may take off from the landing area.

Figure 17:
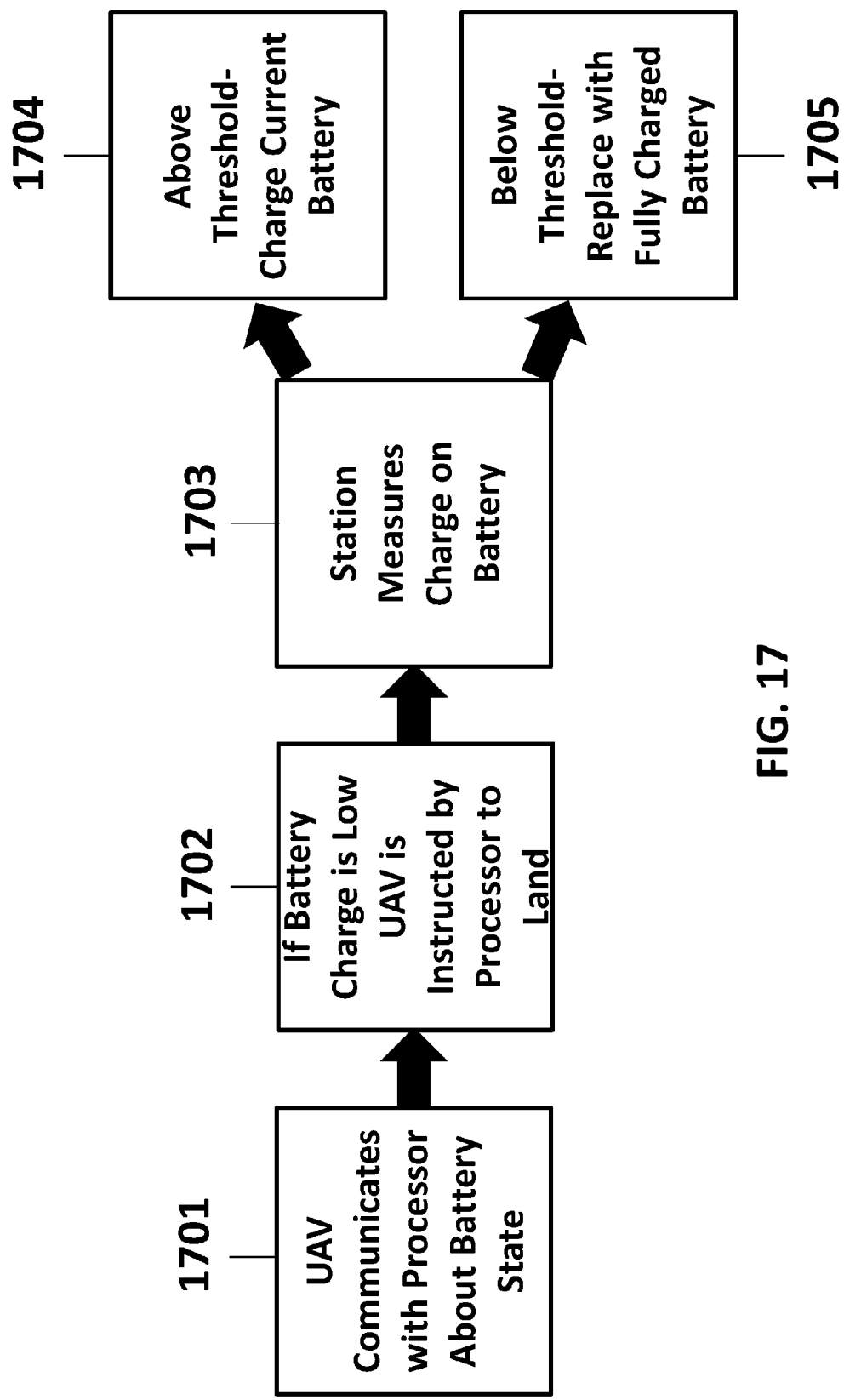
FIG. 17 provides a flow chart of a possible communication between a UAV and a energy provision station.

FIG. 17 shows a flow chart outlining a decision process carried out by one or more processors, individually or collectively, when a UAV approaches a landing area. As the UAV detects an energy provision station in its vicinity it may communicate with energy provision station. The UAV may communicate variables such as flight time, flight distance, time since last charge, or distance remaining on mission to the energy provision station 1701. Based on this information, the processors, which may be on-board or off-board the energy provision station, may instruct the UAV to land on the energy provision station for further assessment 1702. Once the UAV has docked on the landing area the energy provision station may measure the remaining charge on the battery 1703. If the charge is above a pre-determined threshold the energy provision station may provide a charge to the battery currently on board the UAV 1704. If the battery is below a threshold charge percentage the energy provision station may initiate a battery switching procedure 1705 to replace the battery on board the UAV with a fully or partially charged battery from the battery storage system.

Instruction to swap or charge the battery on board the UAV may be based entirely on the remaining charge on the battery relative to a pre-determined threshold value or the instructions may be based on one or more other factors. For example the current charge on the batteries in the battery storage system may influence the instructions. For example, the number of available batteries in the battery storage system may influence the instructions. If no batteries are available, then the battery may be charged on-board, regardless of state of charge. If only a single battery is available, the state of charge of the on-board battery may be compared with the single battery provided by the battery storage system. The battery storage battery charge may affect the instruction to swap or charge the battery such that if the energy provision station has only partially charged batteries in the storage system the processor may give the instruction to charge the battery on board the UAV rather than replacing the battery with a partially charged battery. In another example the time required to swap the battery may be considered in comparison to the time required to charge the battery. A decision to swap the battery or charge the battery may be chosen such that the required time is optimized. Other factors that may influence the outcome of the instruction from the processor may include the number of other UAV's detected in the vicinity by the energy provision station, the mission of the UAV landed on the energy provision station, and/or the current flight conditions (e.g. head wind, tail wind, temperature).

The battery switching procedure may employ the robotic arm mechanism. The first step in the procedure may be for the robotic arm to move vertically so that is may be in line with a recessed battery receptacle which may be the location of the battery to be removed from the UAV. Next the robotic arm may move horizontally to approach the battery to be removed from the UAV. When the robotic arm is sufficiently within the proximity of the battery to be removed from the UAV, the clamp may open and close to attach to the battery. Once the robotic arm has attached to the battery the arm may retreat horizontally from the UAV and move vertically to be in line with an empty storage receptacle in the battery storage system. The robotic arm may place the depleted battery removed from the UAV into the empty storage receptacle in the battery storage system. Next the battery storage system may rotate so that a charged or partially charged battery is in line with the robotic arm. The robotic arm may repeat the steps used to remove the battery from the UAV in order to remove the charged or partially charged battery from the battery storage system. After the robotic arm has clamped on to a charged or partially charged battery the robotic arm may move vertically to be in line with the UAV recessed battery receptacle. The robotic arm may then move horizontally to push the charged or partially charged battery into the recessed battery onboard the UAV. When the battery is fitted in to the recessed battery receptacle the robotic arm may then release the clamp on the battery and retreat from the UAV. After the robotic arm retreats the UAV may take off vertically from the landing area and continue its mission.

The systems, devices, and methods described herein can be applied to a wide variety of movable objects. As previously mentioned, any description herein of an aerial vehicle, such as a UAV, may apply to and be used for any movable object. Any description herein of an aerial vehicle may apply specifically to UAVs. A movable object of the present invention can be configured to move within any suitable environment, such as in air (e.g., a fixed-wing aircraft, a rotary-wing aircraft, or an aircraft having neither fixed wings nor rotary wings), in water (e.g., a ship or a submarine), on ground (e.g., a motor vehicle, such as a car, truck, bus, van, motorcycle, bicycle; a movable structure or frame such as a stick, fishing pole; or a train), under the ground (e.g., a subway), in space (e.g., a spaceplane, a satellite, or a probe), or any combination of these environments. The movable object can be a vehicle, such as a vehicle described elsewhere herein. In some embodiments, the movable object can be carried by a living subject, or take off from a living subject, such as a human or an animal. Suitable animals can include avines, canines, felines, equines, bovines, ovines, porcines, delphines, rodents, or insects.

The movable object may be capable of moving freely within the environment with respect to six degrees of freedom (e.g., three degrees of freedom in translation and three degrees of freedom in rotation). Alternatively, the movement of the movable object can be constrained with respect to one or more degrees of freedom, such as by a predetermined path, track, or orientation. The movement can be actuated by any suitable actuation mechanism, such as an engine or a motor. The actuation mechanism of the movable object can be powered by any suitable energy source, such as electrical energy, magnetic energy, solar energy, wind energy, gravitational energy, chemical energy, nuclear energy, or any suitable combination thereof. The movable object may be self-propelled via a propulsion system, as described elsewhere herein. The propulsion system may optionally run on an energy source, such as electrical energy, magnetic energy, solar energy, wind energy, gravitational energy, chemical energy, nuclear energy, or any suitable combination thereof. Alternatively, the movable object may be carried by a living being.

In some instances, the movable object can be an aerial vehicle. For example, aerial vehicles may be fixed-wing aircraft (e.g., airplane, gliders), rotary-wing aircraft (e.g., helicopters, rotorcraft), aircraft having both fixed wings and rotary wings, or aircraft having neither (e.g., blimps, hot air balloons). An aerial vehicle can be self-propelled, such as self-propelled through the air. A self-propelled aerial vehicle can utilize a propulsion system, such as a propulsion system including one or more engines, motors, wheels, axles, magnets, rotors, propellers, blades, nozzles, or any suitable combination thereof. In some instances, the propulsion system can be used to enable the movable object to take off from a surface, land on a surface, maintain its current position and/or orientation (e.g., hover), change orientation, and/or change position.

The movable object can be controlled remotely by a user or controlled locally by an occupant within or on the movable object. The movable object may be controlled remotely via an occupant within a separate vehicle. In some embodiments, the movable object is an unmanned movable object, such as a UAV. An unmanned movable object, such as a UAV, may not have an occupant onboard the movable object. The movable object can be controlled by a human or an autonomous control system (e.g., a computer control system), or any suitable combination thereof. The movable object can be an autonomous or semi-autonomous robot, such as a robot configured with an artificial intelligence.

The movable object can have any suitable size and/or dimensions. In some embodiments, the movable object may be of a size and/or dimensions to have a human occupant within or on the vehicle. Alternatively, the movable object may be of size and/or dimensions smaller than that capable of having a human occupant within or on the vehicle. The movable object may be of a size and/or dimensions suitable for being lifted or carried by a human. Alternatively, the movable object may be larger than a size and/or dimensions suitable for being lifted or carried by a human. In some instances, the movable object may have a maximum dimension (e.g., length, width, height, diameter, diagonal) of less than or equal to about: 2 cm, 5 cm, 10 cm, 50 cm, 1 m, 2 m, 5 m, or 10 m. The maximum dimension may be greater than or equal to about: 2 cm, 5 cm, 10 cm, 50 cm, 1 m, 2 m, 5 m, or 10 m. For example, the distance between shafts of opposite rotors of the movable object may be less than or equal to about: 2 cm, 5 cm, 10 cm, 50 cm, 1 m, 2 m, 5 m, or 10 m. Alternatively, the distance between shafts of opposite rotors may be greater than or equal to about: 2 cm, 5 cm, 10 cm, 50 cm, 1 m, 2 m, 5 m, or 10 m.

In some embodiments, the movable object may have a volume of less than 100 cm×100 cm×100 cm, less than 50 cm×50 cm×30 cm, or less than 5 cm×5 cm×3 cm. The total volume of the movable object may be less than or equal to about: 1 cm$^3$, 2 cm$^3$, 5 cm$^3$, 10 cm$^3$, 20 cm$^3$, 30 cm$^3$, 40 cm$^3$, 50 cm$^3$, 60 cm$^3$, 70 cm$^3$, 80 cm$^3$, 90 cm$^3$, 100 cm$^3$, 150 cm$^3$, 200 cm$^3$, 300 cm$^3$, 500 cm$^3$, 750 cm$^3$, 1000 cm$^3$, 5000 cm$^3$, 10,000 cm$^3$, 100,000 cm$^3$3, 1 m$^3$, or 10 m$^3$. Conversely, the total volume of the movable object may be greater than or equal to about: 1 cm$^3$, 2 cm$^3$, 5 cm$^3$, 10 cm$^3$, 20 cm$^3$, 30 cm$^3$, 40 cm$^3$, 50 cm$^3$, 60 cm$^3$, 70 cm$^3$, 80 cm$^3$, 90 cm$^3$, 100 cm$^3$, 150 cm$^3$, 200 cm$^3$, 300 cm$^3$, 500 cm$^3$, 750 cm$^3$, 1000 cm$^3$, 5000 cm$^3$, 10,000 cm$^3$, 100,000 cm$^3$, 1 m$^3$, or 10 m$^3$.

In some embodiments, the movable object may have a footprint (which may refer to the lateral cross-sectional area encompassed by the movable object) less than or equal to about: 32,000 cm$^2$, 20,000 cm$^2$, 10,000 cm$^2$, 1,000 cm$^2$, 500 cm$^2$, 100 cm$^2$, 50 cm$^2$, 10 cm$^2$, or 5 cm$^2$. Conversely, the footprint may be greater than or equal to about: 32,000 cm$^2$, 20,000 cm$^2$, 10,000 cm$^2$, 1,000 cm$^2$, 500 cm$^2$, 100 cm$^2$, 50 cm$^2$, 10 cm$^2$, or 5 cm$^2$.

In some instances, the movable object may weigh no more than 1000 kg. The weight of the movable object may be less than or equal to about: 1000 kg, 750 kg, 500 kg, 200 kg, 150 kg, 100 kg, 80 kg, 70 kg, 60 kg, 50 kg, 45 kg, 40 kg, 35 kg, 30 kg, 25 kg, 20 kg, 15 kg, 12 kg, 10 kg, 9 kg, 8 kg, 7 kg, 6 kg, 5 kg, 4 kg, 3 kg, 2 kg, 1 kg, 0.5 kg, 0.1 kg, 0.05 kg, or 0.01 kg. Conversely, the weight may be greater than or equal to about: 1000 kg, 750 kg, 500 kg, 200 kg, 150 kg, 100 kg, 80 kg, 70 kg, 60 kg, 50 kg, 45 kg, 40 kg, 35 kg, 30 kg, 25 kg, 20 kg, 15 kg, 12 kg, 10 kg, 9 kg, 8 kg, 7 kg, 6 kg, 5 kg, 4 kg, 3 kg, 2 kg, 1 kg, 0.5 kg, 0.1 kg, 0.05 kg, or 0.01 kg.

In some embodiments, a movable object may be small relative to a load carried by the movable object. The load may include a payload and/or a carrier, as described in further detail elsewhere herein. In some examples, a ratio of a movable object weight to a load weight may be greater than, less than, or equal to about 1:1. In some instances, a ratio of a movable object weight to a load weight may be greater than, less than, or equal to about 1:1. Optionally, a ratio of a carrier weight to a load weight may be greater than, less than, or equal to about 1:1. When desired, the ratio of an movable object weight to a load weight may be less than or equal to: 1:2, 1:3, 1:4, 1:5, 1:10, or even less. Conversely, the ratio of a movable object weight to a load weight can also be greater than or equal to: 2:1, 3:1, 4:1, 5:1, 10:1, or even greater.

In some embodiments, the movable object may have low energy consumption. For example, the movable object may use less than about: 5 W/h, 4 W/h, 3 W/h, 2 W/h, 1 W/h, or less. In some instances, a carrier of the movable object may have low energy consumption. For example, the carrier may use less than about: 5 W/h, 4 W/h, 3 W/h, 2 W/h, 1 W/h, or less. Optionally, a payload of the movable object may have low energy consumption, such as less than about: 5 W/h, 4 W/h, 3 W/h, 2 W/h, 1 W/h, or less.

Figure 18:
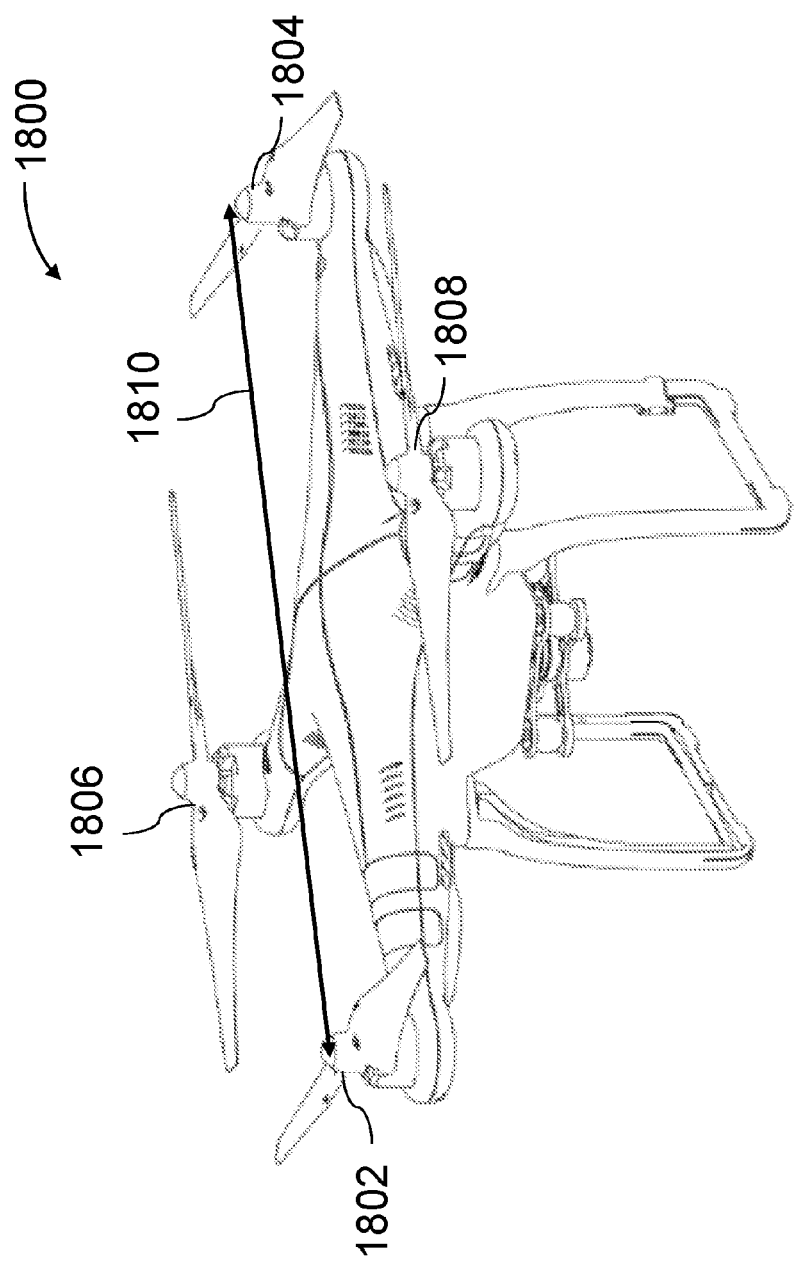
FIG. 18 illustrates an unmanned aerial vehicle, in accordance with an embodiment of the invention.

FIG. 18 illustrates an unmanned aerial vehicle (UAV) 1800, in accordance with embodiments of the present invention. The UAV may be an example of a movable object as described herein. The UAV 1800 can include a propulsion system having four rotors 1802, 1804, 1806, and 1808. Any number of rotors may be provided (e.g., one, two, three, four, five, six, or more). The rotors, rotor assemblies, or other propulsion systems of the unmanned aerial vehicle may enable the unmanned aerial vehicle to hover/maintain position, change orientation, and/or change location. The distance between shafts of opposite rotors can be any suitable length 410. For example, the length 1810 can be less than or equal to 2 m, or less than equal to 5 m. In some embodiments, the length 1810 can be within a range from 40 cm to 1 m, from 10 cm to 2 m, or from 5 cm to 5 m. Any description herein of a UAV may apply to a movable object, such as a movable object of a different type, and vice versa. The UAV may use an assisted takeoff system or method as described herein.

In some embodiments, the movable object can be configured to carry a load. The load can include one or more of passengers, cargo, equipment, instruments, and the like. The load can be provided within a housing. The housing may be separate from a housing of the movable object, or be part of a housing for a movable object. Alternatively, the load can be provided with a housing while the movable object does not have a housing. Alternatively, portions of the load or the entire load can be provided without a housing. The load can be rigidly fixed relative to the movable object. Optionally, the load can be movable relative to the movable object (e.g., translatable or rotatable relative to the movable object). The load can include a payload and/or a carrier, as described elsewhere herein.

In some embodiments, the movement of the movable object, carrier, and payload relative to a fixed reference frame (e.g., the surrounding environment) and/or to each other, can be controlled by a terminal. The terminal can be a remote control device at a location distant from the movable object, carrier, and/or payload. The terminal can be disposed on or affixed to a support platform. Alternatively, the terminal can be a handheld or wearable device. For example, the terminal can include a smartphone, tablet, laptop, computer, glasses, gloves, helmet, microphone, or suitable combinations thereof. The terminal can include a user interface, such as a keyboard, mouse, joystick, touch-screen, or display. Any suitable user input can be used to interact with the terminal, such as manually entered commands, voice control, gesture control, or position control (e.g., via a movement, location or tilt of the terminal).

The terminal can be used to control any suitable state of the movable object, carrier, and/or payload. For example, the terminal can be used to control the position and/or orientation of the movable object, carrier, and/or payload relative to a fixed reference from and/or to each other. In some embodiments, the terminal can be used to control individual elements of the movable object, carrier, and/or payload, such as the actuation assembly of the carrier, a sensor of the payload, or an emitter of the payload. The terminal can include a wireless communication device adapted to communicate with one or more of the movable object, carrier, or payload.

The terminal can include a suitable display unit for viewing information of the movable object, carrier, and/or payload. For example, the terminal can be configured to display information of the movable object, carrier, and/or payload with respect to position, translational velocity, translational acceleration, orientation, angular velocity, angular acceleration, or any suitable combinations thereof. In some embodiments, the terminal can display information provided by the payload, such as data provided by a functional payload (e.g., images recorded by a camera or other image capturing device).

Optionally, the same terminal may both control the movable object, carrier, and/or payload, or a state of the movable object, carrier and/or payload, as well as receive and/or display information from the movable object, carrier and/or payload. For example, a terminal may control the positioning of the payload relative to an environment, while displaying image data captured by the payload, or information about the position of the payload. Alternatively, different terminals may be used for different functions. For example, a first terminal may control movement or a state of the movable object, carrier, and/or payload while a second terminal may receive and/or display information from the movable object, carrier, and/or payload. For example, a first terminal may be used to control the positioning of the payload relative to an environment while a second terminal displays image data captured by the payload. Various communication modes may be utilized between a movable object and an integrated terminal that both controls the movable object and receives data, or between the movable object and multiple terminals that both control the movable object and receives data. For example, at least two different communication modes may be formed between the movable object and the terminal that both controls the movable object and receives data from the movable object.

Figure 19:
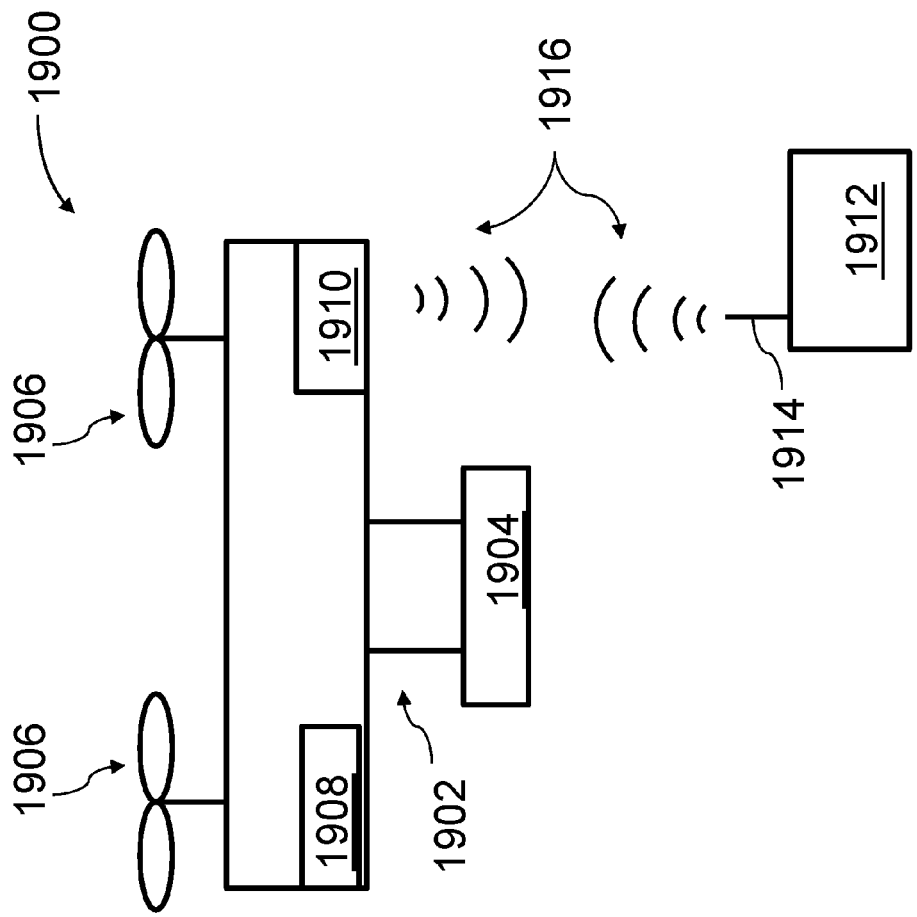
FIG. 19 illustrates a movable object including a carrier and a payload, in accordance with an embodiment of the invention.

FIG. 19 illustrates a movable object 1900 including a carrier 1902 and a payload 1904, in accordance with embodiments. Although the movable object 1900 is depicted as an aircraft, this depiction is not intended to be limiting, and any suitable type of movable object can be used, as previously described herein. One of skill in the art would appreciate that any of the embodiments described herein in the context of aircraft systems can be applied to any suitable movable object (e.g., an UAV). In some instances, the payload 1904 may be provided on the movable object 1900 without requiring the carrier 1902. The movable object 1900 may include propulsion mechanisms 1906, a sensing system 1908, and a communication system 1910.

The propulsion mechanisms 1906 can include one or more of rotors, propellers, blades, engines, motors, wheels, axles, magnets, or nozzles, as previously described. The movable object may have one or more, two or more, three or more, or four or more propulsion mechanisms. The propulsion mechanisms may all be of the same type. Alternatively, one or more propulsion mechanisms can be different types of propulsion mechanisms. The propulsion mechanisms 1906 can be mounted on the movable object 1900 using any suitable means, such as a support element (e.g., a drive shaft) as described elsewhere herein. The propulsion mechanisms 1906 can be mounted on any suitable portion of the movable object 1900, such on the top, bottom, front, back, sides, or suitable combinations thereof.

In some embodiments, the propulsion mechanisms 1906 can enable the movable object 1800 to take off vertically from a surface or land vertically on a surface without requiring any horizontal movement of the movable object 1900 (e.g., without traveling down a runway). Optionally, the propulsion mechanisms 1906 can be operable to permit the movable object 1900 to hover in the air at a specified position and/or orientation. One or more of the propulsion mechanisms 1900 may be controlled independently of the other propulsion mechanisms. Alternatively, the propulsion mechanisms 1900 can be configured to be controlled simultaneously. For example, the movable object 1900 can have multiple horizontally oriented rotors that can provide lift and/or thrust to the movable object. The multiple horizontally oriented rotors can be actuated to provide vertical takeoff, vertical landing, and hovering capabilities to the movable object 1900. In some embodiments, one or more of the horizontally oriented rotors may spin in a clockwise direction, while one or more of the horizontally rotors may spin in a counterclockwise direction. For example, the number of clockwise rotors may be equal to the number of counterclockwise rotors. The rotation rate of each of the horizontally oriented rotors can be varied independently in order to control the lift and/or thrust produced by each rotor, and thereby adjust the spatial disposition, velocity, and/or acceleration of the movable object 1800 (e.g., with respect to up to three degrees of translation and up to three degrees of rotation).

The sensing system 1908 can include one or more sensors that may sense the spatial disposition, velocity, and/or acceleration of the movable object 1900 (e.g., with respect to up to three degrees of translation and up to three degrees of rotation). The one or more sensors can include global positioning system (GPS) sensors, motion sensors, inertial sensors, proximity sensors, or image sensors. The sensing data provided by the sensing system 1908 can be used to control the spatial disposition, velocity, and/or orientation of the movable object 1900 (e.g., using a suitable processing unit and/or control module, as described below). Alternatively, the sensing system 1908 can be used to provide data regarding the environment surrounding the movable object, such as weather conditions, proximity to potential obstacles, location of geographical features, location of manmade structures, and the like.

The communication system 1910 enables communication with terminal 1912 having a communication system 1914 via wireless signals 1916. The communication systems 1910, 1914 may include any number of transmitters, receivers, and/or transceivers suitable for wireless communication. The communication may be one-way communication, such that data can be transmitted in only one direction. For example, one-way communication may involve only the movable object 1900 transmitting data to the terminal 1912, or vice-versa. The data may be transmitted from one or more transmitters of the communication system 1910 to one or more receivers of the communication system 1912, or vice-versa. Alternatively, the communication may be two-way communication, such that data can be transmitted in both directions between the movable object 1900 and the terminal 1912. The two-way communication can involve transmitting data from one or more transmitters of the communication system 1910 to one or more receivers of the communication system 1914, and vice-versa.

In some embodiments, the terminal 1912 can provide control data to one or more of the movable object 1900, carrier 1902, and payload 1904 and receive information from one or more of the movable object 1900, carrier 1902, and payload 1904 (e.g., position and/or motion information of the movable object, carrier or payload; data sensed by the payload such as image data captured by a payload camera). In some instances, control data from the terminal may include instructions for relative positions, movements, actuations, or controls of the movable object, carrier and/or payload. For example, the control data may result in a modification of the location and/or orientation of the movable object (e.g., via control of the propulsion mechanisms 1906), or a movement of the payload with respect to the movable object (e.g., via control of the carrier 1902). The control data from the terminal may result in control of the payload, such as control of the operation of a camera or other image capturing device (e.g., taking still or moving pictures, zooming in or out, turning on or off, switching imaging modes, change image resolution, changing focus, changing depth of field, changing exposure time, changing viewing angle or field of view). In some instances, the communications from the movable object, carrier and/or payload may include information from one or more sensors (e.g., of the sensing system 1908 or of the payload 1904). The communications may include sensed information from one or more different types of sensors (e.g., GPS sensors, motion sensors, inertial sensor, proximity sensors, or image sensors). Such information may pertain to the position (e.g., location, orientation), movement, or acceleration of the movable object, carrier and/or payload. Such information from a payload may include data captured by the payload or a sensed state of the payload. The control data provided transmitted by the terminal 1912 can be configured to control a state of one or more of the movable object 1900, carrier 1902, or payload 1904. Alternatively or in combination, the carrier 1902 and payload 1904 can also each include a communication module configured to communicate with terminal 1912, such that the terminal can communicate with and control each of the movable object 1900, carrier 1902, and payload 1904 independently.

In some embodiments, the movable object 1900 can be configured to communicate with another remote device in addition to the terminal 1912, or instead of the terminal 1912. The terminal 1912 may also be configured to communicate with another remote device as well as the movable object 1900. For example, the movable object 1900 and/or terminal 1912 may communicate with another movable object, or a carrier or payload of another movable object. When desired, the remote device may be a second terminal or other computing device (e.g., computer, laptop, tablet, smartphone, or other mobile device). The remote device can be configured to transmit data to the movable object 1900, receive data from the movable object 1900, transmit data to the terminal 1912, and/or receive data from the terminal 1912. Optionally, the remote device can be connected to the Internet or other telecommunications network, such that data received from the movable object 1900 and/or terminal 1912 can be uploaded to a website or server.

Figure 20:
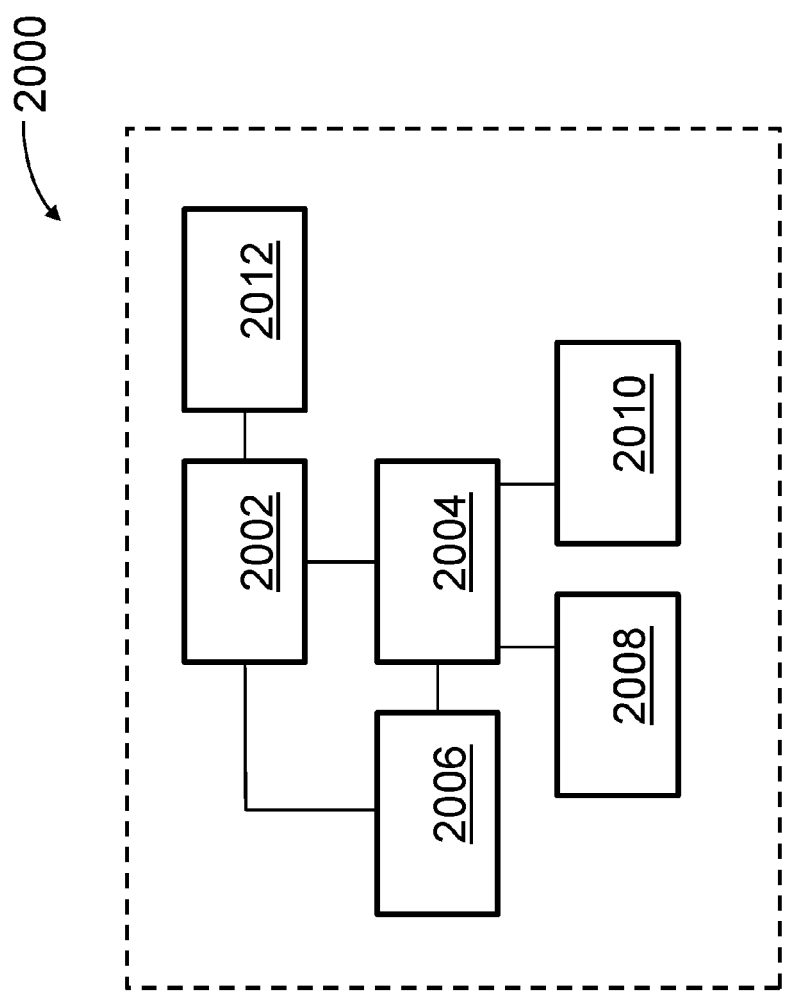
FIG. 20 is a schematic illustration by way of block diagram of a system for controlling a movable object, in accordance with an embodiment of the invention.

FIG. 20 is a schematic illustration by way of block diagram of a system 2000 for controlling a movable object, in accordance with embodiments. The system 2000 can be used in combination with any suitable embodiment of the systems, devices, and methods disclosed herein. The system 2000 can include a sensing module 2002, processing unit 2004, non-transitory computer readable medium 2006, control module 2008, and communication module 2010.

The sensing module 2002 can utilize different types of sensors that collect information relating to the movable objects in different ways. Different types of sensors may sense different types of signals or signals from different sources. For example, the sensors can include inertial sensors, GPS sensors, proximity sensors (e.g., lidar), or vision/image sensors (e.g., a camera). The sensing module 2002 can be operatively coupled to a processing unit 2004 having a plurality of processors. In some embodiments, the sensing module can be operatively coupled to a transmission module 2012 (e.g., a Wi-Fi image transmission module) configured to directly transmit sensing data to a suitable external device or system. For example, the transmission module 2012 can be used to transmit images captured by a camera of the sensing module 2002 to a remote terminal.

The processing unit 2004 can have one or more processors, such as a programmable processor (e.g., a central processing unit (CPU)). The processing unit 2004 can be operatively coupled to a non-transitory computer readable medium 2006. The non-transitory computer readable medium 2006 can store logic, code, and/or program instructions executable by the processing unit 2004 for performing one or more steps. The non-transitory computer readable medium can include one or more memory units (e.g., removable media or external storage such as an SD card or random access memory (RAM)). In some embodiments, data from the sensing module 2002 can be directly conveyed to and stored within the memory units of the non-transitory computer readable medium 2006. The memory units of the non-transitory computer readable medium 2006 can store logic, code and/or program instructions executable by the processing unit 2004 to perform any suitable embodiment of the methods described herein. For example, the processing unit 2004 can be configured to execute instructions causing one or more processors of the processing unit 2004 to analyze sensing data produced by the sensing module. The memory units can store sensing data from the sensing module to be processed by the processing unit 2004. In some embodiments, the memory units of the non-transitory computer readable medium 2006 can be used to store the processing results produced by the processing unit 2004.

In some embodiments, the processing unit 2004 can be operatively coupled to a control module 2008 configured to control a state of the movable object. For example, the control module 2008 can be configured to control the propulsion mechanisms of the movable object to adjust the spatial disposition, velocity, and/or acceleration of the movable object with respect to six degrees of freedom. Alternatively or in combination, the control module 2008 can control one or more of a state of a carrier, payload, or sensing module.

The processing unit 2004 can be operatively coupled to a communication module 2010 configured to transmit and/or receive data from one or more external devices (e.g., a terminal, display device, or other remote controller). Any suitable means of communication can be used, such as wired communication or wireless communication. For example, the communication module 2010 can utilize one or more of local area networks (LAN), wide area networks (WAN), infrared, radio, WiFi, point-to-point (P2P) networks, telecommunication networks, cloud communication, and the like. Optionally, relay stations, such as towers, satellites, or mobile stations, can be used. Wireless communications can be proximity dependent or proximity independent. In some embodiments, line-of-sight may or may not be required for communications. The communication module 2010 can transmit and/or receive one or more of sensing data from the sensing module 2002, processing results produced by the processing unit 2004, predetermined control data, user commands from a terminal or remote controller, and the like.

The components of the system 2000 can be arranged in any suitable configuration. For example, one or more of the components of the system 2000 can be located on the movable object, carrier, payload, terminal, sensing system, or an additional external device in communication with one or more of the above. Additionally, although FIG. 20 depicts a single processing unit 2004 and a single non-transitory computer readable medium 2006, one of skill in the art would appreciate that this is not intended to be limiting, and that the system 2000 can include a plurality of processing units and/or non-transitory computer readable media. In some embodiments, one or more of the plurality of processing units and/or non-transitory computer readable media can be situated at different locations, such as on the movable object, carrier, payload, terminal, sensing module, additional external device in communication with one or more of the above, or suitable combinations thereof, such that any suitable aspect of the processing and/or memory functions performed by the system 2000 can occur at one or more of the aforementioned locations.

While preferred embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention. It is intended that the following claims define the scope of the invention and that methods and structures within the scope of these claims and their equivalents be covered thereby.

What is claimed is:

1. An unmanned aerial vehicle (UAV) energy provision station comprising:
   a) a landing area that supports a UAV when the UAV is landed at the station, wherein the UAV is operably coupled to (1) a first battery that provides power to the UAV and (2) a backup power source that provides power to the UAV when the first battery is decoupled from the UAV, wherein the backup power source is another battery onboard the UAV; and
   b) a battery replacement member that decouples the first battery from the UAV such that the first battery no longer provides power to said UAV, and wherein the backup power source provides power to the UAV prior to or concurrent with said decoupling, thereby allowing the UAV to remain powered before, during, and after the first battery is decoupled from the UAV.

2. The UAV energy provision station of claim 1, wherein the backup power source further comprises a renewable energy generation power source onboard the UAV.

3. The UAV energy provision station of claim 1, further comprising: a movable battery storage unit comprising a plurality of holding stations configured to collectively store a plurality of batteries each capable of powering the UAV upon being operably coupled to the UAV, wherein the movable battery storage unit is configured to permit simultaneous movement of the plurality of holding stations relative to the landing area.

4. A method of providing continuous power to an unmanned aerial vehicle (UAV), said method comprising:
   a) providing power to the UAV via a battery when the battery is operably coupled to the UAV;
   b) assessing, with aid of one or more processors individually or collectively, a reliability of a first backup energy source and a second backup energy source that provide power to the UAV prior to or concurrent with decoupling of said battery from the UAV;
   c) selecting, with aid of the one or more processors individually or collectively, the first backup energy source or the second backup energy source based on the assessed reliability; and
   d) providing power to the UAV via the selected first or second backup energy source prior to or concurrent with the decoupling of said battery from the UAV.

5. The method of claim 4, wherein the first backup energy source is another battery onboard the UAV.

6. The method of claim 5, wherein the reliability of the first backup energy source is assessed based on a state of charge of the another battery onboard the UAV.

7. The method of claim 6, wherein the first backup energy source is assessed to have low reliability when the another battery has a low state of charge.

8. The method of claim 4, wherein the second backup energy source is a power unit onboard an UAV energy provision station that supports the UAV while the UAV is not in flight.

9. The method of claim 7, wherein the reliability of the second backup energy source is assessed based on a consistency of power provided by the power unit over a period of time.

10. The method of claim 9, wherein the second backup energy source is assessed to have low reliability when the power provided by the power unit over the period of time has low consistency.

11. The method of claim 4, further comprising: (1) selecting the first backup energy source to power the UAV when the first backup energy source is assessed to have a higher reliability than the second backup energy source, and (2) selecting the second backup energy source to power the UAV when the second backup energy source is assessed to have a higher reliability than the first backup energy source.

12. The method of claim 4, further comprising: selecting the first backup energy source to power the UAV when (1)

the first backup energy source is a default source of backup power, and (2) when the first backup energy source's assessed reliability does not fall beneath a predetermined threshold.

13. The method of claim 4, further comprising: selecting the second backup energy source when (1) the second backup energy source is a default source of backup power, and (2) the second backup energy source's assessed reliability does not fall beneath a predetermined threshold.

14. The method of claim 4, further comprising: supporting the UAV on a landing area of an UAV energy provision station.

15. The method of claim 14, further comprising:
decoupling the battery from the UAV using a battery replacement member that is part of the UAV energy provision station; and
providing power to the UAV using the selected first backup energy source or the second backup energy source when the battery is being decoupled from the UAV or after the battery is decoupled from the UAV.

* * * * *